US008654373B2

(12) United States Patent
Murahashi et al.

(10) Patent No.: US 8,654,373 B2
(45) Date of Patent: Feb. 18, 2014

(54) PRINTING SYSTEM, PRINTER, HOST COMPUTER, PRINTING SYSTEM CONTROL METHOD, AND PROGRAM

(75) Inventors: Kenichi Murahashi, Nagano-ken (JP); Keigo Ejiri, Nagano-ken (JP); Toshiaki Koike, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1229 days.

(21) Appl. No.: 12/197,711

(22) Filed: Aug. 25, 2008

(65) Prior Publication Data

US 2009/0059281 A1    Mar. 5, 2009

(30) Foreign Application Priority Data

Aug. 30, 2007  (JP) .................................. 2007223562
Aug. 30, 2007  (JP) .................................. 2007223563
Aug. 30, 2007  (JP) .................................. 2007223564

(51) Int. Cl.
*G06F 3/12* (2006.01)
*G06K 15/00* (2006.01)

(52) U.S. Cl.
USPC ........ 358/1.15; 358/1.13; 358/1.14; 358/1.16

(58) Field of Classification Search
USPC ........................................................ 358/1.15
See application file for complete search history.

(56) References Cited

U.S. PATENT DOCUMENTS

| 6,149,323 | A | 11/2000 | Shima |  |
|---|---|---|---|---|
| 7,034,954 | B1 * | 4/2006 | Utsunomiya | ................ 358/1.16 |
| 7,471,406 | B2 | 12/2008 | Tsuchitoi |  |
| 2003/0227647 | A1 * | 12/2003 | Gallacher | .................... 358/1.15 |
| 2004/0145772 | A1 * | 7/2004 | Stringham | .................... 358/1.15 |
| 2007/0008577 | A1 * | 1/2007 | Matsuura et al. | ............ 358/1.15 |
| 2007/0019226 | A1 * | 1/2007 | Matsuura et al. | ............ 358/1.14 |
| 2007/0061374 | A1 * | 3/2007 | Inakawa et al. | ............... 707/200 |
| 2007/0229882 | A1 * | 10/2007 | Kondo | ......................... 358/1.15 |

FOREIGN PATENT DOCUMENTS

| JP | 07-172032 |  | 7/1995 |
|---|---|---|---|
| JP | 10-326167 | A | 12/1998 |
| JP | 2001125763 |  | 5/2001 |
| JP | 2004-001408 | A | 1/2004 |
| JP | 2005100178 | A * | 4/2005 |
| JP | 2005222310 |  | 8/2005 |
| JP | 2006-094127 | A | 4/2006 |
| JP | 2007-034616 | A | 2/2007 |
| JP | 2007188308 |  | 7/2007 |
| JP | 2007-196594 | A | 8/2007 |
| JP | 2007196594 |  | 8/2007 |

* cited by examiner

*Primary Examiner* — Marivelisse Santiago-Cordero
*Assistant Examiner* — Huo Long Chen

(57) ABSTRACT

A printing system enables easily recognizing the status of a printing process. The host computer 2 has a print job transmission unit that sends print jobs to a printer, a notification pattern setting unit that sets a notification pattern, and a notification control command transmission unit that sends a notification control command asynchronously to the print job transmission unit. The printer 3 has a print job reception unit that receives the print jobs, a printing unit 48, a print job detection unit that detects print job commands, for example, a notification control command reception unit that receives the notification control commands, a storage unit 53 that stores the received notification control commands, a first notification evaluation unit that, when triggered by a detection by the print job detection unit, determines if there is a notification control command containing the same print job ID as the print job, and a notification unit that outputs a user notification based on the notification pattern contained in the notification control command when there is a notification control command.

7 Claims, 13 Drawing Sheets

PRINTING SYSTEM, PRINTER, HOST COMPUTER, PRINTING SYSTEM CONTROL METHOD, AND PROGRAM

CROSS-REFERENCE TO RELATED APPLICATIONS

Japanese Patent application No.(s) 2007-223562, 2007-223563, and 2007-223564 are hereby incorporated by reference in their entirety.

BACKGROUND

1. Field of Invention

The present invention relates to a printing system, a printer, a host computer, a printing system control method, and a program for printing based on print jobs sent from a host computer.

2. Description of Related Art

Systems for executing printing processes by connecting a host computer to a printer and sending print data generated by the host computer to the printer are known from the literature. In POS systems used in supermarkets and retail stores, for example, the POS terminal computer produces print data from product data based on product information input by the sales clerk or other operator, and sends the print data to the printer. The printer then prints a receipt or coupon, for example, based on the received print data. The printed receipt or coupon is also cut to an appropriate length and then discharged from the receipt transportation path. See, for example, Japanese Unexamined Patent Appl. Pub. JP-A-2005-222310.

With the POS system described above, however, the operator cannot determine at what point the receipt, coupon, or other printed matter will be output. More particularly, coupons are generally issued only for specified products, and it can be difficult for the operator to know whether or not a coupon will be issued for a particular product.

As a result, when the store is busy with many customers and there is little extra time, the operator may not notice that something was printed (issued) and may forget to give a printout that has value to the customer (such as the receipt or coupon) to the customer.

Furthermore, if the operator tries to remove the receipt or coupon before the paper is cut, the receipt or coupon may be torn. This can result in a paper jam in the printer and interruption of print services until the problem is corrected, and prevents issuing receipts and coupons.

SUMMARY OF INVENTION

The printing system, printer, host computer, printing system control method, and program of the invention are directed to the foregoing problem and enable the operator to easily know the status of a printing process.

A printing system according to a first aspect of the invention has a host computer, and a printer that is connected to the host computer, prints based on received print data, and has a notification function. The host computer has a print job transmission unit that sends a print job including the print data to the printer, a notification pattern setting unit that sets a notification pattern defined by at least one of a notification count, a notification time, and a notification interval, and a notification control command transmission unit that operates asynchronously to the print job transmission unit and sends a notification control command including a notification pattern and print job ID corresponding to the print job to the printer.

The printer has a print job reception unit that receives the print job, a printing unit that prints based on the print data contained in the received print job, a print job detection unit that detects if predetermined data or a predetermined command is contained in the print job, a notification control command reception unit that receives the notification control command, a storage unit that stores the received notification control command, a first notification evaluation unit that, when triggered by the print job detection unit detecting the predetermined data or command, determines if a notification control command containing the same print job ID as the print job ID of the print job is in the storage unit, and a notification unit that outputs a user notification based on the notification pattern contained in the notification control command when the first notification evaluation unit determines that a notification control command containing the print job ID is stored.

Another aspect of the invention is a control method for a printing system that has a host computer, and a printer that is connected to the host computer, prints based on received print data, and has a notification function. The host computer executes a print job transmission step that sends a print job including the print data to the printer, a notification pattern setting step that sets a notification pattern defined by at least one of a notification count, a notification time, and a notification interval, and a notification control command transmission step that operates asynchronously to transmission of the print job by the print job transmission step and sends a notification control command including a notification pattern and print job ID corresponding to the print job to the printer. The printer executes a print job reception step that receives the print job, a printing step that prints based on the print data contained in the received print job, a print job detection step that detects if predetermined data or a predetermined command is contained in the print job, a notification control command reception step that receives the notification control command, a storage step that stores the received notification control command, a first notification evaluation step that, when triggered by the print job detection step detecting the predetermined data or command, determines if there is a stored notification control command containing the same print job ID as the print job ID of the print job, and a notification step that outputs a user notification based on the notification pattern contained in the notification control command when the first notification evaluation step determines that a notification control command containing the print job ID is stored.

With this aspect of the invention a notification control command can be sent with a print job containing the print job from the host computer to the printer. The printer stores the received notification control command in memory (storage unit) and executes the print job. If the printer detects predetermined data or a predetermined command in the print job (such as data or a command indicating the start or end of the print job), this detection triggers determining if a notification control command containing the same print job ID as the print job ID of the print job is stored in local memory. If the notification control command containing the same print job ID is in memory, an alarm or other notification is output by the notification unit. The operator thus knows the status (condition) of the printing process, or more particularly whether some kind of printout will be (or was) issued (printed) by the printer.

Furthermore, because the print job and notification control command are transmitted asynchronously, if transmission of a print job is delayed for some reason, such as because a print job is being processed or a printer error prevents sending print jobs, the notification control command can be sent without being affected by the print job status.

In addition, by receiving and storing the notification control command memory asynchronously to the print job, the print job can start and the notification process can be executed immediately after detecting the predetermined data or command. The notification can be issued audibly by sounding an alarm, or visually by causing an indicator to light or blink, for example.

A printer according to another aspect of the invention has a print job reception unit that receives a print job containing print data; a printing unit that prints based on the print data contained in the received print job; a print job detection unit that detects if predetermined data or a predetermined command is contained in the print job; a notification control command reception unit that receives a notification control command asynchronously to receiving the print job, the notification control command containing a print job ID corresponding to the print job and a notification pattern defined by at least one of a notification count, a notification time, and a notification interval; a storage unit that stores the received notification control command; a first notification evaluation unit that, when triggered by the print job detection unit detecting the predetermined data or command, determines if a notification control command containing the same print job ID as the print job ID of the print job is in the storage unit; and a notification unit that outputs a user notification based on the notification pattern contained in the notification control command when the first notification evaluation unit determines that a notification control command containing the print job ID is stored.

In this aspect of the invention the printer receives a notification control command together with the print job containing the print data, stores the notification control command in local memory (storage unit), and executes the print job. If the printer detects predetermined data or a predetermined command in the print job (such as data or a command indicating the start or end of the print job), this detection triggers determining if a notification control command containing the same print job ID as the print job ID of the print job is stored in local memory. If the notification control command containing the same print job ID is in memory, an alarm or other notification is output by the notification unit. The operator thus knows the status (condition) of the printing process, or more particularly whether some kind of printout will be (or was) issued (printed) by the printer.

In addition, by receiving and storing the notification control command memory asynchronously to the print job, the print job can start and the notification process can be executed immediately after detecting the predetermined data or command. The notification can be issued audibly by sounding an alarm, or visually by causing an indicator to light or blink, for example.

In a printing system according to another aspect of the invention the print job detection unit detects prescribed data or a command denoting the start of print job execution.

In a printer according to another aspect of the invention the print job detection unit detects prescribed data or a command denoting the start of print job execution.

This aspect of the invention enables detecting the start of a print job. The operator can therefore know that a printing process (print job) issuing a particular printout such as a receipt or coupon has started, and can thus be prevented from not realizing that something is being printed (issued) and forgetting to give a printout of value to the customer (such as a receipt or coupon) to the customer.

In a printing system according to another aspect of the invention the print job detection unit detects prescribed data or a command denoting the completion of print job execution.

In a printer according to another aspect of the invention the print job detection unit detects prescribed data or a command denoting the completion of print job execution.

This aspect of the invention enables detecting the completion of a print job. As a result, the operator reliably knows that the printing process (print job) issuing a receipt, coupon, or other printout has been completed, and can be prevented from accidentally tearing the printout as a result of trying to remove the printout before the printing process is finished (particularly before the paper has been cut). Paper jams in the printer resulting from tearing the paper can thus be prevented, and the operating rate of the printing services can be improved.

In a printing system according to another aspect of the invention the print job detection unit detects prescribed data or a command denoting the start of print job execution and the completion of print job execution; and the notification unit starts the notification based on the result from the first notification evaluation unit when triggered by the print job detection unit detecting the start of print job execution, and ends the notification based on the result from the first notification evaluation unit when triggered by the print job detection unit detecting the completion of print job execution.

In a printer according to another aspect of the invention the print job detection unit detects prescribed data or a command denoting the start of print job execution and the completion of print job execution; and the notification unit starts the notification based on the result from the first notification evaluation unit when triggered by the print job detection unit detecting the start of print job execution, and ends the notification based on the result from the first notification evaluation unit when triggered by the print job detection unit detecting the completion of print job execution.

By sustaining the notification (alarm) while the print job is executing, the operator knows from the notification that a printing process is executing for a particular printout. More particularly, the operator knows that when the notification (alarm) stops (such as when the indicator turns off or stops blinking, or an alarm stops sounding or buzzing) printing the printout (the print job) is finished. Paper jams in the printer resulting from tearing the paper can thus be prevented, and the operating rate of the printing services can be improved.

In a printing system according to another aspect of the invention the notification control command also includes information defining the output timing of the notification by the notification unit.

In a printer according to another aspect of the invention the notification control command also includes information defining the output timing of the notification by the notification unit.

This aspect of the invention enables controlling when the notification (alarm) is issued, such as before a print job starts or after a print job is completed. The notification or alarm can therefore be output at the timing appropriate to the user's need, such as before or after a print job executes, that is, before or after the coupon or other printout is printed.

In a printing system according to another aspect of the invention the printer also has a print job ID storage unit that stores the print job ID of the print job being executed, a job history storage unit that stores a history of print job execution, and a second notification evaluation unit that determines if the same print job ID as the print job ID contained in the notification control command is stored in at least one of the print job ID storage unit and job history storage unit when the notification control command is received; and the notification unit immediately outputs the notification when the second notification evaluation unit determines the print job ID is stored.

In a printer according to another aspect of the invention the printer also has a print job ID storage unit that stores the print job ID of the print job being executed, a job history storage unit that stores a history of print job execution, and a second notification evaluation unit that determines if the same print job ID as the print job ID contained in the notification control command is stored in at least one of the print job ID storage unit and job history storage unit when the notification control command is received; and the notification unit immediately outputs the notification when the second notification evaluation unit determines the print job ID is stored.

When a notification control command is received with this aspect of the invention, the printer determines if the print job identified by the print job ID contained in the notification control command is currently being printed (that is, if the print job ID is stored in the print job ID storage unit), or if the print job ID is stored in the execution history (that is, is stored in the job history storage unit). If the print job is executing or is stored in the job history, the notification is immediately output based on the notification control command. As a result, even if the notification control command is delayed for some reason, the operator can be reliably informed when a print job starts (that issuing the printout has started), when a print job ends (that issuing the printout is completed), or that the printout is now being printed.

In a printing system according to another aspect of the invention the printer is connected to a plurality of host computers; the notification control command also contains host information identifying a particular host computer; the first notification evaluation unit determines if a notification control command containing the same print job ID and host information as the print job ID and host information of the print job is in the storage unit; and the notification unit that outputs a user notification based on the notification pattern contained in the notification control command when the first notification evaluation unit determines that a notification control command containing the print job ID and host information is stored.

The first notification evaluation unit of the printer in this aspect of the invention determines if a notification control command containing the same print job ID and host information as the print job ID and host information of the print job is stored in memory. As a result, if the notification control command is in memory, the operator is informed by the notification unit. By thus including host information, the printer knows from which host computer the print job being printed was received. For example, by setting a different notification pattern for each host computer, the operator can know which host computer sent the print job resulting in the printout from the printer when a single printer is shared by a plurality of host computers. The operator can therefore identify the customer to whom the printout belongs, and can therefore prevent problems such as forgetting to give the printout to the customer.

In a printing system according to another aspect of the invention the printer also has a job history storage unit that stores a history of print job execution, and a second notification evaluation unit that determines if the same print job ID and host information as the print job ID and host information contained in the notification control command is stored in the job history storage unit when the notification control command is received; and the notification unit immediately outputs the notification when the second notification evaluation unit determines the print job ID and host information are stored.

When a notification control command is received in this aspect of the invention, the printer determines if the print job ID and host information contained in the notification control command are stored in the job execution history, and if they are immediately issues the notification based on the notification control command. As a result, the operator can be reliably notified that a print job has started or ended, that is, that the printout was issued or is being printed, even if the notification control command is delayed for some reason.

In a printing system according to another aspect of the invention the host computer also has a print job evaluation unit that determines if the print job meets a predetermined condition; and the notification control command transmission unit transmits only the notification control command corresponding to the print job that meets the predetermined condition to the printer.

This aspect of the invention enables notifying the operator that a particular print job is finished. For example, if multiple items are being printed for a single customer and the notification is output only after completion of the print job that prints the last item, the operator can know that all items printed before the notification was output belong to the same customer, and can be prevented from forgetting to give the printout to the customer.

In a printing system according to another aspect of the invention the printer also has a notification pattern storage unit that stores a plurality of preset notification patterns; and the notification control command contains information specifying one notification pattern from among the plural notification patterns.

By pre-installing a plurality of notification patterns to the printer, the host computer only needs to send information identifying which notification pattern to use to the printer, and does not need to send the notification pattern itself. This reduces data traffic associated with transmitting the notification pattern.

In a printing system according to another aspect of the invention the notification unit outputs the notification by producing an electronic sound.

By issuing notifications using an electronic buzzer, the operator can be easily informed of the start or end of a print job (or that the print job is being printed). As a result, even if the operator is talking with a customer, for example, and not looking at the printer, the operator can easily realize that something was printed.

Another aspect of the invention is a host computer used in the printing system described above.

Using such a host computer enables achieving a printing system that can notify the user of print job execution, including the start and the end of a print job.

Another aspect of the invention is a program causing a computer to execute the steps of the printing system control method described above.

Using this provides a program that can notify the user of print job execution, including the start and the end of a print job.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Embodiment 1

A printing system according to a first embodiment of the invention is described next with reference to the accompanying figures. The printing system according to this embodiment enables the operator to easily recognize when the printing process starts. This embodiment uses coupons as an example of the printer output, and notifies the operator by issuing an alarm by means of an electronic buzzer from a notification unit.

Figure 1:
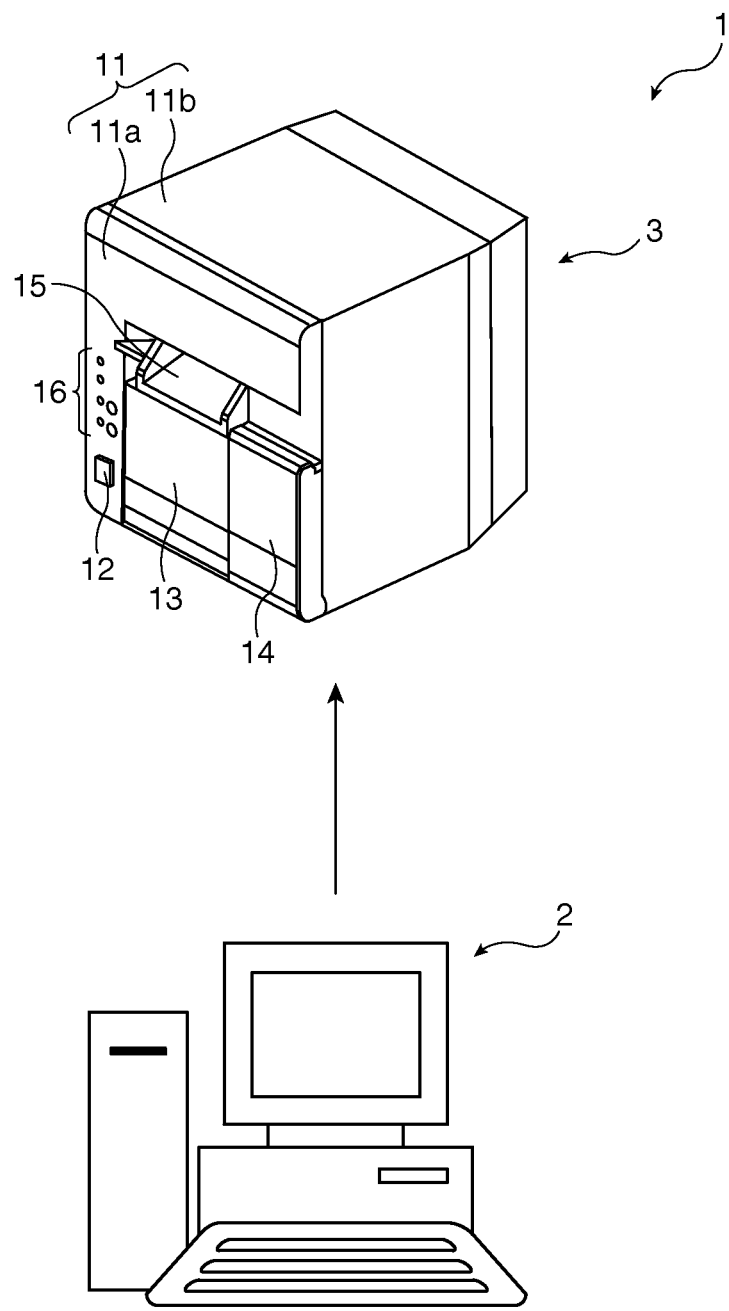
FIG. 1 shows the general configuration of a printing system according to the first and second embodiments of the invention.

FIG. 1 shows the major components of the printing system 1 according to the first embodiment of the invention. As shown in FIG. 1, the printing system 1 according to this first embodiment includes a host computer 2 and a printer 3. The host computer 2 outputs the print jobs and alarm control commands (notification control commands) corresponding to the print jobs. The printer 3 has functions for printing based on the print job received from the host computer 2, and issuing an alarm based on the alarm control command.

The host computer 2 is a computer that manages the printer 3 and sends print jobs to the printer 3 (that is, outputs print commands). When a request to issue a coupon, for example, is received from a POS application not shown, a business application 31 described below is run by the host computer 2 to generate a print job based on the received request, and assign a print job ID to each print job. The print jobs are managed and sent to the printer 3 based on the print job IDs.

After generating a print job, the host computer 2 generates an alarm control command to sound the buzzer 46 (notification unit, see FIG. 2) of the printer 3 as may be necessary. The alarm control command is defined by the print job ID identifying the print job for which the buzzer 46 of the printer 3 is to be sounded before printing starts, and the sound pattern (notification pattern, further described below) issued by the buzzer 46. By sending this alarm control command to the printer 3, the host computer 2 causes the buzzer 46 to sound at a specific time (before printing starts) with a specific pattern.

The printer 3 in this embodiment is an inkjet printer 3 that prints using multiple colors of ink to print images (color images) on the paper used as the recording medium to issue coupons. As shown in FIG. 1, the printer 3 has a power switch 12, roll paper compartment cover 13, and loading unit access cover 14 disposed in order from the left side of the front of the printer case 11, which includes a front top panel 11a and a case cover 11b, and a paper exit 15 for discharging the roll paper disposed above the roll paper compartment cover 13. A plurality of LEDs 16 for reporting the status of the printer 3 to the operator (user) are also located above the power switch 12. Roll paper (not shown in the figure) having the printing paper wound in a roll is loaded inside the roll paper compartment cover 13, and the ink cartridges (not shown in the figure) are installed inside the loading unit access cover 14.

When the printer 3 receives a print job from the host computer 2, the printer 3 prints the desired image, which may include pictures or text, in color on the paper based on the print job, and then discharges the printed paper (a coupon in this example) from the paper exit 15. The printer 3 also receives alarm control commands from the host computer 2 and controls sounding the buzzer 46 of the printer based on the alarm control command. When starting the printing process for a print job, the printer 3 drives the buzzer 46 to issue an electronic sound based on the alarm pattern indicated by the alarm control command containing the print job ID of the particular print job in order to notify the operator that the printing process started, and in this example to notify the operator that a coupon will be discharged from the paper exit 15. By issuing an audible alarm using an electronic buzzer, the operator can easily know that a print job is starting, and more particularly that a coupon will be issued, even when the operator is interacting with a customer and is not looking at the printer 3.

The notification or means of reporting the start of a print job (that a coupon will be discharged from the paper exit 15) can be audible, by driving the buzzer 46 to output an electronic sound using the alarm control command as described above, or visual by using the command to cause an LED 16 to light steady or blink in a particular pattern.

The host computer 2 and printer 3 of the printing system 1 according to the present invention are described next with reference to the control block diagram in FIG. 2.

The host computer 2 has a CPU 21 (central processing unit), ROM 22 (read-only memory), RAM 23 (random access memory), a hard disk drive 24, an input device 25, and a communication interface 26. A control program stored on the hard disk drive 24 is copied to RAM 23 at startup, and data stored in RAM 23, for example, is processed according to this control program. The business application 31 and a spooler 32 are also stored on the hard disk drive 24.

The CPU 21 executes the business application 31 and generates the desired alarm pattern based on input from the input device 25. The alarm pattern includes the frequency, alarm duration, mute time, volume, and the number of repetitions, for example. The user can change any of these parameters to generate the desired alarm pattern or to generate the alarm stopping pattern.

When information for issuing a coupon (referred to below as "coupon information") is received from the POS application, for example, the CPU 21 runs the business application 31 and generates print data based on the coupon information. The business application 31 sends a print request with the generated print data to the spooler 32.

The spooler 32 generates a print job based on the print data, and assigns a print job ID to the print job. The print job includes printing control commands such as a JobStart command denoting the start of a print job, a JobName command containing the print job ID, a JobPrint command specifying printing the print data, and a JobEnd command denoting the end of the print job, and the print data. The spooler 32 sends the print job ID to the business application 31 as the response to the print request, and the business application 31 thus acquires the print job ID.

The CPU 21 then sends the print job received from the spooler 32 through the communication interface 26 (print job transmission unit) to the printer 3.

The business application 31 then determines if the print job ID is a particular print job ID (such as the print job ID for issuing the last coupon to be issued to a particular customer) (print job evaluation unit). If the print job ID is the particular print job ID, the business application 31 links the alarm pattern to the print job ID to generate the alarm control command. Using the API of the business application 31, the CPU 21 then sends the alarm control command through the communication interface 26 to the printer 3 (alarm control command transmission unit).

By sending an alarm control command for a particular print job, the operator can be informed of the start of a particular print job by the printer 3, or more particularly in this example that a particular coupon will be issued. For example, by signaling the start of the print job for only the last coupon when a plurality of coupons are issued for a single customer, the operator can know that the coupon is the last coupon for that customer. The operator can therefore reliably know that the last coupon and all of the coupons printed before the notification are for the same customer, and can therefore be prevented from forgetting to give a coupon to the customer.

Sending the print job and sending the alarm control command occur asynchronously, the alarm control command is sent using the User Datagram Protocol (UDP), and the print job is sent using the Transmission Control Protocol (TCP). If transmission of a print job is delayed for some reason, such as because a print job is being processed, using these protocols enables sending the alarm control command without being affected by the print job status.

The printer 3 has a CPU 41, flash ROM 42, RAM 43, a communication interface 44, a printing control unit 45, a paper transportation mechanism 47, a print head 48 (printing unit), a buzzer 46 (notification unit), and an LED 16. Data in RAM 43 is processed according to a control program stored in flash ROM 42. A job history storage area 51 (job history storage unit) for recording the job history of print jobs is reserved in RAM 43, and the print job IDs of already completed print jobs and the print job for which printing has started are stored in this job history storage area 51. A print job ID storage area 52 for storing the print job ID of the print job currently being processed, and a command storage area 53 (storage unit) for recording the alarm control command, are also reserved in RAM 43.

The CPU 41 receives the alarm control command from the host computer 2 through the communication interface 44 (alarm control command reception unit). The CPU 41 then determines if the print job ID contained in the alarm control command matches the print job ID of the print job that is recorded in the print job ID storage area 52 for the print job for which the printing process has started (second notification evaluation unit).

If the print job ID matches the print job ID of the print job that has started, the CPU 41 immediately causes the buzzer 46 to sound based on the alarm pattern contained in the alarm control command.

If the IDs do not match (including when there is no print job started), the CPU 41 determines if the print job ID contained in the alarm control command is recorded in the job history storage area 51 (second notification evaluation unit), and based on the result controls driving the buzzer 46.

More specifically, if the print job ID is not recorded in the job history storage area 51, the CPU 41 temporarily stores the alarm control command in the command storage area 53.

If the print job ID is recorded in the job history storage area 51 as a completed job, the CPU 41 immediately drives the buzzer 46 to sound based on the alarm pattern contained in the alarm control command.

By determining if a print job ID matching the print job ID of the alarm control command already exists when an alarm control command is received by first referencing the print job ID storage area 52, which records only the print job ID of the process currently started, the decision can be made more quickly than if the job history storage area 51 that stores a plurality of print job IDs must be searched to decide. More particularly, the alarm can be sounded more quickly to notify the user. As a result, if the alarm control command is delayed for some reason, the operator can be reliably notified that the print job has started, that is, that a coupon (printout) will be issued or is being printed.

The CPU 41 receives print jobs from the host computer 2 through the communication interface 44 (print job reception unit). The CPU 41 processes the received print job based on the printing control command. More specifically, the CPU 41 starts processing the print job when it reads the JobStart command, and then interprets the JobName command. The print job ID is set as a parameter in the JobName command, and the CPU 41 thus acquires the print job ID for the print job. When the CPU 41 reads the JobName command and detects that the print job has started (print job detection unit), it records the print job ID in the print job ID storage area 52 and job history storage area 51 with the printing-started status.

Triggered by this detection, the CPU 41 determines if there is an alarm control command containing the same print job ID as the print job ID of the print job stored in the command storage area 53 (first notification evaluation unit). If the corresponding alarm control command is found, the CPU 41 controls the buzzer 46 to sound based on the alarm pattern in the alarm control command. After the buzzer 46 stops, the CPU 41 clears the alarm control command stored in the command storage area 53.

The CPU 41 then interprets the JobPrint command and starts printing the print data. In this case the CPU 41 outputs a print command based on the print data to the printing control unit 45. After receiving the print command, the printing control unit 45 drives the print head 48 while advancing the roll paper by means of the paper transportation mechanism 47 based on the print data to print on the roll paper and discharge a coupon from the paper exit 15. When the CPU 41 then reads (processes) the JobEnd command contained in the print job (print control command) and finishes processing the command, all processing for the print job is completed.

Figure 3:
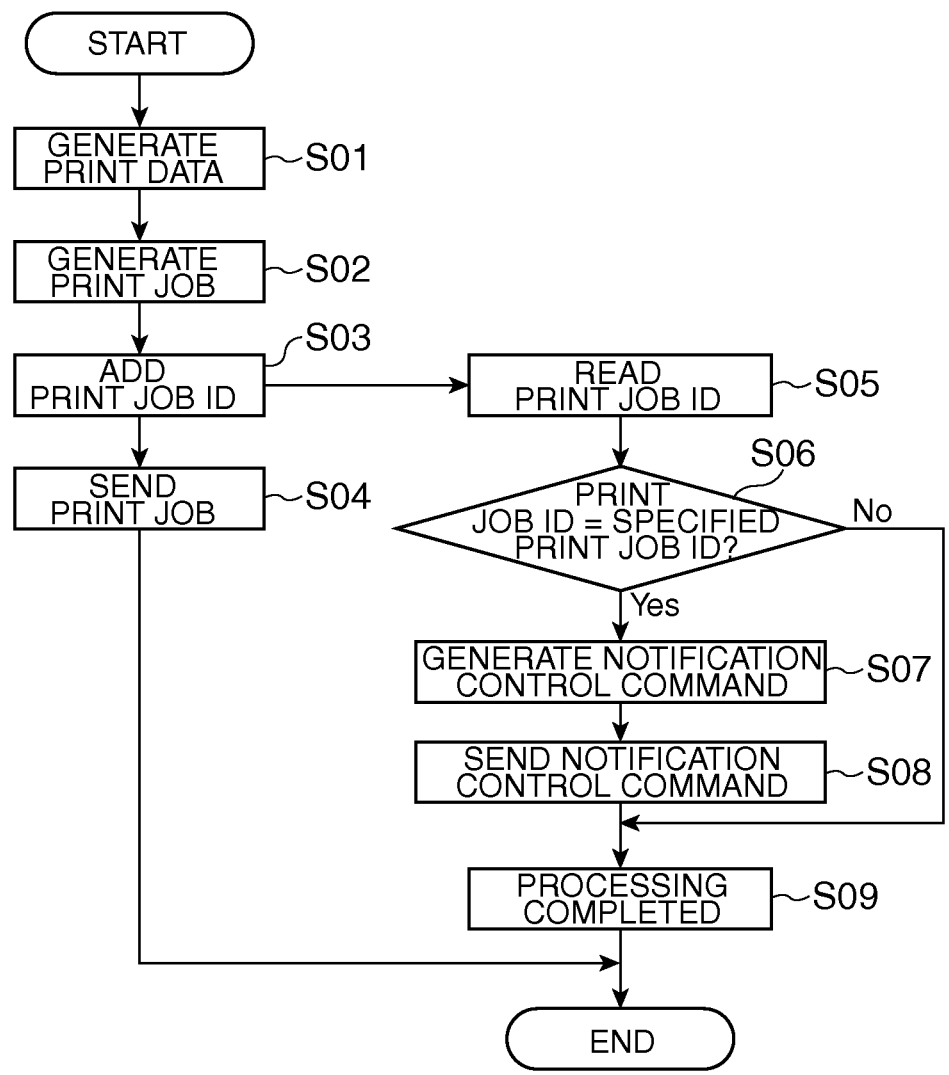
FIG. 3 is a flow chart showing a procedure for generating print jobs and alarm control commands in the first and second embodiments of the invention.

The process of generating a print job and the alarm control command is described next with reference to FIG. 3.

When the host computer 2 receives the coupon information, it generates print data based on the coupon information (S01). The host computer 2 then generates a print job based on the generated print data (S02) and assigns a print job ID to the print job (S03). The host computer 2 then sends the print job to the printer 3 (S04, print job transmission unit).

The host computer 2 also determines if the print job ID is a specific print job ID (S05, print job evaluation unit). If the print job ID is the predetermined print job ID (S06 returns Yes), the host computer 2 generates an alarm control command containing the print job ID and the alarm pattern of the buzzer 46 (S07). The host computer 2 then sends this alarm control command to the printer 3 asynchronously to transmission of the print job (S08, notification control command transmission unit), and completes the process (S09). However, if the print job ID is not the predetermined print job ID (S06 returns No), the host computer 2 aborts processing without generating the alarm control command (S09).

Figure 4:
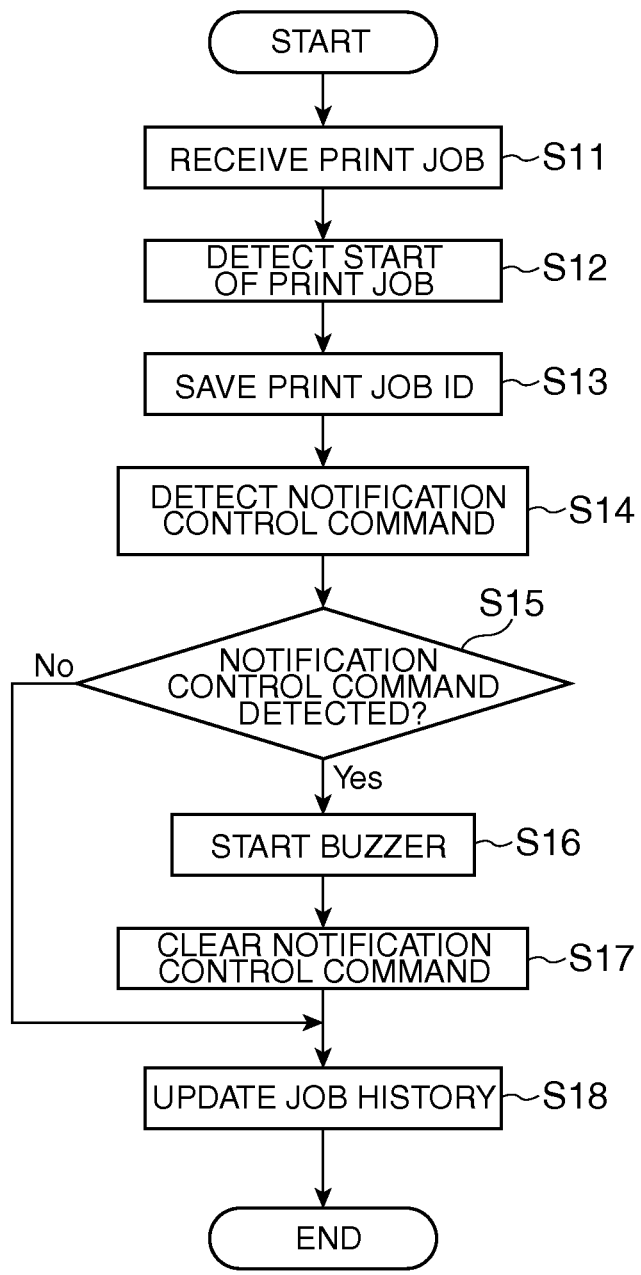
FIG. 4 is a flow chart showing the operation of the printer according to the first embodiment of the invention when a print job is received.

Operation of the printer 3 when the printer 3 receives a print job from the host computer 2 (the printing system control method) is described next with reference to FIG. 4.

The printer 3 first receives a print job sent from the host computer 2 (S11, print job reception unit). The printer 3 then starts a printing process based on the print job. More specifically, the printer 3 detects the start of a print job by receiving (interpreting) the JobName command (or JobStart command) contained in the print job (S12, print job detection unit). The printer 3 thus acquires the print job ID contained in the print job, and records the print job ID in the job history storage area 51 and print job ID storage area 52 with the printing-process-started status (S13). Whether an alarm control command containing the same print job ID as the print job ID of the print job is stored in the command storage area 53 is also determined (S14, first notification evaluation unit).

If the corresponding alarm control command is not stored (S15 returns No), the printer 3 continues the printing process, and after the entire printing process based on the print job is completed updates the status of the print job ID in the job history storage area 51 to printing-process-completed (S18).

If the corresponding alarm control command is found (S15 returns Yes), the printer 3 causes the buzzer 46 to sound based on the alarm pattern of the alarm control command (S16). After the buzzer 46 stops, the printer 3 clears the alarm control command recorded in the command storage area 53 (S17). The printer 3 then continues the printing process, and after completing the entire printing process based on the print job updates the status of the print job ID in the job history storage area 51 to printing-process-completed (S18).

Figure 5:
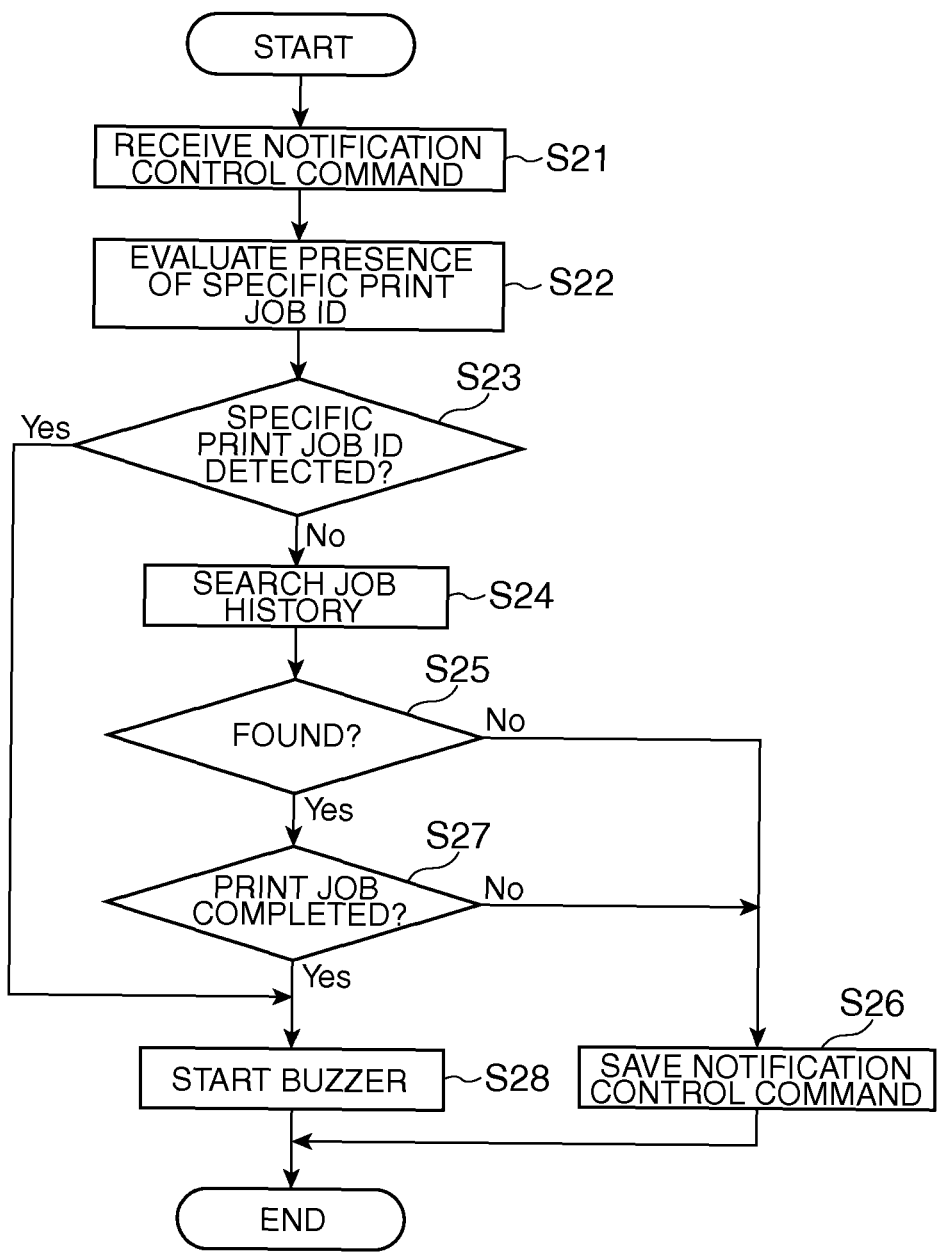
FIG. 5 is a flow chart showing the operation of the printer according to the first embodiment of the invention when an alarm control command is received.

Operation when the printer 3 receives an alarm control command is described next with reference to FIG. 5.

The printer 3 first receives an alarm control command sent from the host computer 2 (S21, alarm control command reception unit). The printer 3 then determines if the same print job ID as the print job ID contained in the received alarm control command is recorded in the print job ID storage area 52 (S22, second notification evaluation unit). More specifically, the printer 3 determines if a print job having the print job ID contained in the alarm control command is being printed.

If the corresponding print job ID is in the print job ID storage area 52 (S23 returns Yes), the printer 3 immediately causes the buzzer 46 to sound based on the alarm pattern of the alarm control command (S28).

If the corresponding print job ID is not in the print job ID storage area 52 (S23 returns No), the printer 3 searches the job history storage area 51 to determine if the print job ID is recorded in the job history storage area 51 (S24, second notification evaluation unit).

If the corresponding print job ID is not in the job history storage area 51 (S25 returns No), the printer 3 writes the alarm control command in the command storage area 53 (S26).

However, if the print job ID is recorded in the job history storage area 51 (S25 returns Yes), the printer 3 determines if the status of the print job ID recorded in the job history storage area 51 is set to printing-process-completed. If the status of the print job ID is other than printing-process-completed (S27 returns No), the alarm control command is recorded in the command storage area 53 (S26). If the status of the print job ID is printing-process-completed (S27 returns Yes), the printer 3 immediately causes the buzzer 46 to sound based on the alarm pattern of the alarm control command (S28).

This first embodiment of the invention thus sends print jobs and alarm control commands asynchronously from the host computer 2 to the printer 3. The printer 3 that receives the print job and alarm control command then executes a printing process based on the print job. Triggered by detecting the start of a print job, the printer 3 causes the buzzer 46 to sound based on the alarm pattern contained in the alarm control command containing the same print job ID as the print job ID of the print job. This sounding of the buzzer 46 enables the operator to know that a print job has started, that is, that printout of some kind will be printed (discharged) from the printer 3. The operator thus knows when the process (print job) issuing a receipt, coupon, or other printout has started, and can thus be prevented from not realizing that something is being printed (issued) and forgetting to give a printout of value to the customer (such as a receipt or coupon) to the customer.

Embodiment 2

A printing system 1 according to a second embodiment of the invention is described next. The printing system 1 of this second embodiment differs from the printing system 1 of the first embodiment in reporting the end of the printing process. The control and equipment configurations, and the process of generating print jobs and alarm control commands, in the printing system 1 according to this second embodiment are the same as in the first embodiment described above (see FIG. 1 to FIG. 3), and the following description of the second embodiment therefore focuses on the differences between the embodiments.

As shown in FIG. 1, the printing system 1 according to this second embodiment includes a host computer 2 and a printer 3. The host computer 2 outputs the print jobs and alarm control commands. The printer 3 has functions for printing based on the print job received from the host computer 2, and issuing an alarm based on the alarm control command.

The host computer 2 is a computer that manages the printer 3 and sends print jobs to the printer 3.

After generating a print job, the host computer 2 generates an alarm control command to sound the buzzer 46 (notification unit) of the printer 3 as may be necessary. The alarm control command is defined by the print job ID identifying the print job for which the buzzer 46 of the printer 3 is to be sounded after printing ends, and the sound pattern (notification pattern) issued by the buzzer 46. By sending this alarm control command to the printer 3, the host computer 2 causes the buzzer 46 to sound at a specific time (after printing ends) with a specific pattern.

When the printer 3 receives a print job from the host computer 2, the printer 3 prints the desired image based on the print job, and then discharges the printed paper (a coupon in this example) from the paper exit 15. The printer 3 also receives alarm control commands from the host computer 2 and controls sounding the buzzer 46 of the printer based on the alarm control command. When the printing process for a print job ends, the printer 3 drives the buzzer 46 to issue an electronic sound based on the alarm pattern indicated by the alarm control command containing the print job ID of the particular print job in order to notify the operator that the printing process ended, and in this example to notify the operator that a coupon was discharged from the paper exit 15. By issuing an audible alarm using an electronic buzzer, the operator can easily know that a print job ended, and more particularly that a coupon was issued, even when the operator is interacting with a customer and is not looking at the printer 3.

The means of reporting the end of a print job (that a coupon was discharged from the paper exit 15) can be audible, by driving the buzzer 46 to output an electronic sound using the alarm control command as described above, or visual by using the command to cause an LED 16 shown in FIG. 1 to light steady or blink in a particular pattern.

The host computer 2 and printer 3 of the printing system 1 according to this second embodiment of the invention are described next with reference to the control block diagram in FIG. 2. The control configuration of the host computer 2 in this second embodiment is identical to the first embodiment (see FIG. 2).

The CPU 21 executes the business application 31 and generates the desired alarm pattern based on input from the input device 25.

When information for issuing a coupon (coupon information) is received from the POS application, for example, the CPU 21 runs the business application 31 and generates print data based on the coupon information. The business application 31 sends a print request with the generated print data to the spooler 32. The spooler 32 sends the print job ID to the business application 31 as the response to the print request, and the business application 31 thus acquires the print job ID.

The CPU 21 then sends the print job received from the spooler 32 through the communication interface 26 (print job transmission unit) to the printer 3.

The business application 31 then determines if the print job ID is a particular print job ID (print job evaluation unit). If the print job ID is the particular print job ID, the business application 31 links the alarm pattern to the print job ID to generate the alarm control command. Using the API of the business application 31, the CPU 21 then sends the alarm control command through the communication interface 26 to the printer 3 (alarm control command transmission unit).

By sending an alarm control command for a particular print job, the operator can be informed of the end of a particular print job by the printer 3, or more particularly in this example that a particular coupon was issued. For example, by signalling the end of the print job for only the last coupon when a plurality of coupons are issued for a single customer, the operator can know that all of the coupons printed before the notification are for the same customer, and can therefore be prevented from forgetting to give a coupon to the customer.

Sending the print job and sending the alarm control command occur asynchronously, the alarm control command is sent by UDP, and the print job is sent by TCP. By using packet communications to transmit the data (print jobs and alarm control commands), an opening process that recognizes the beginning of the data in the following alarm control command executes as soon as the closing processing that recognizes the end of the print job data ends when the alarm control command is sent after the print job. More particularly, the time required by these processes introduces a delay between completion of a print job and when executing the alarm control command actually starts. However, by asynchronously transmitting the data, the alarm control command can be sent without being affected by the print job status, it is not necessary to wait until packet processing is completed in the closing process and opening process, and a delay can be prevented between completion of a print job and the start of alarm control command execution.

Figure 2:
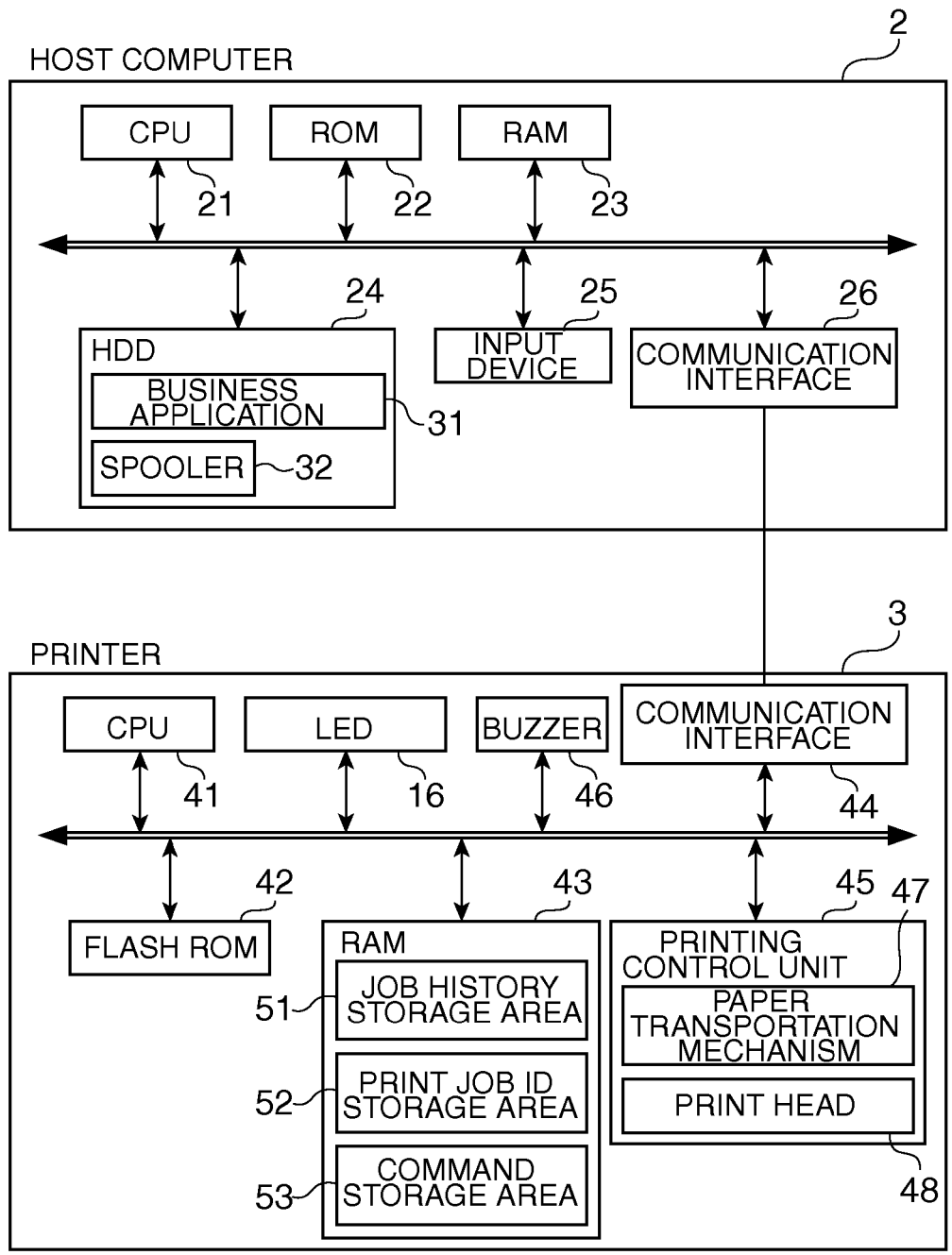
FIG. 2 is a control block diagram of the host computer and printer in the first and second embodiments of the invention.

The printer 3 in this second embodiment of the invention has the same control configuration as in the first embodiment (see FIG. 2). A job history storage area 51 (job history storage unit) for recording the job history of print jobs is reserved in RAM 43, and the print job IDs of already completed print jobs and the print job being processed are stored in this job history storage area 51. A print job ID storage area 52 for storing the print job ID of the print job currently being processed, and a command storage area 53 (storage unit) for recording the alarm control command, are also reserved in RAM 43.

The CPU 41 receives the alarm control command from the host computer 2 through the communication interface 44 (alarm control command reception unit). The CPU 41 then determines if the print job ID contained in the alarm control command matches the print job ID of the print job that is recorded in the print job ID storage area 52 for the print job being executed. If the print job ID matches the print job ID of the print job being executed, the CPU 41 records the alarm control command in the command storage area 53.

If the IDs do not match (including when there is no print job executing), the CPU 41 determines if the print job ID contained in the alarm control command is recorded in the job history storage area 51 (second notification evaluation unit), and based on the result controls driving the buzzer 46. This enables reliably informing the operator that a print job has ended, and more particularly that the coupon (or other printout) was issued, even if the alarm control command is delayed for some reason.

The CPU 41 receives print jobs from the host computer 2 through the communication interface 44 (print job reception unit). The CPU 41 processes the received print job based on the printing control command. More specifically, the CPU 41 starts processing the print job when it reads the JobStart command, and then interprets the JobName command. The print job ID is set as a parameter in the JobName command, and the CPU 41 thus acquires the print job ID for the print job. The CPU 41 then records the print job ID in the print job ID storage area 52 and job history storage area 51 with the now-printing status.

The CPU 41 then interprets the JobPrint command and starts printing the print data. In this case the CPU 41 outputs a print command based on the print data to the printing control unit 45. After receiving the print command, the printing control unit 45 prints based on the print data to output. After printing (operation) is completed, the CPU 41 then reads (processes) the JobEnd command contained in the print job (print control command) and completes all processing for the print job by finishing processing the command (print job detection unit).

Triggered by this detection result, the CPU 41 determines if there is an alarm control command containing the same print job ID as the print job ID of the print job stored in the command storage area 53 (first notification evaluation unit). If the corresponding alarm control command is found, the CPU 41 controls the buzzer 46 to sound based on the alarm pattern in the alarm control command, and updates the job history storage area 51 to change the status of the print job to printing-completed. After the buzzer 46 stops, the CPU 41 clears the alarm control command stored in the command storage area 53.

If the corresponding alarm control command is not found, the job history storage area 51 is updated to change the status of the print job to printing-completed.

Figure 6:
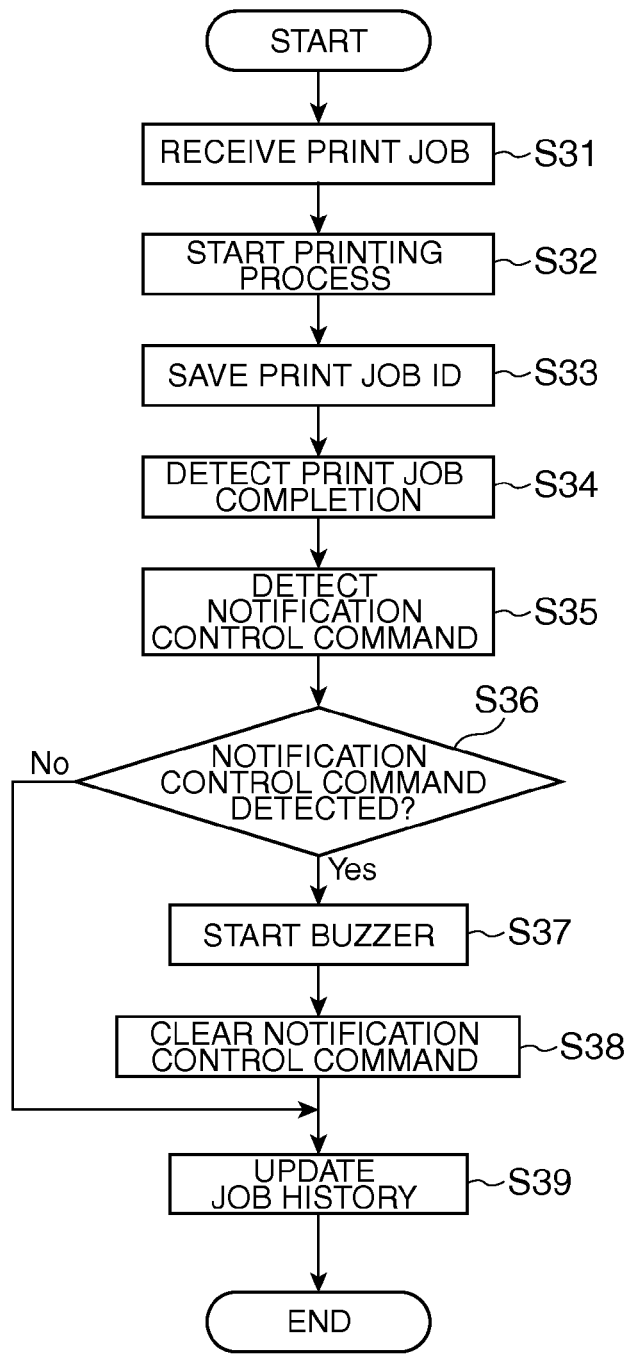
FIG. 6 is a flow chart showing the operation of the printer according to the second embodiment of the invention when a print job is received.

Operation of the printer 3 when a print job is received is described next with reference to FIG. 6.

The printer 3 first receives a print job sent from the host computer 2 (S31, print job reception unit). The printer 3 then starts a printing process based on the print job (S32). The printer 3 thus acquires the print job ID contained in the print job, and records the print job ID in the job history storage area 51 and print job ID storage area 52 with the now-printing status (S33).

When the printer 3 then detects completion of the entire printing process for the print job (S34, print job detection unit), it determines if an alarm control command containing the same print job ID as the print job ID of the print job is stored in the command storage area 53 (S35, first notification evaluation unit).

If the corresponding alarm control command is not stored (S36 returns No), the printer 3 updates the status of the print job ID in the job history storage area 51 to printing-process-completed (S39).

If the corresponding alarm control command is found (S36 returns Yes), the printer 3 causes the buzzer 46 to sound based on the alarm pattern of the alarm control command (S37). After the buzzer 46 stops, the printer 3 clears the alarm control command recorded in the command storage area 53 (S38). The printer 3 then updates the status of the print job ID in the job history storage area 51 to printing-process-completed (S39).

Figure 7:
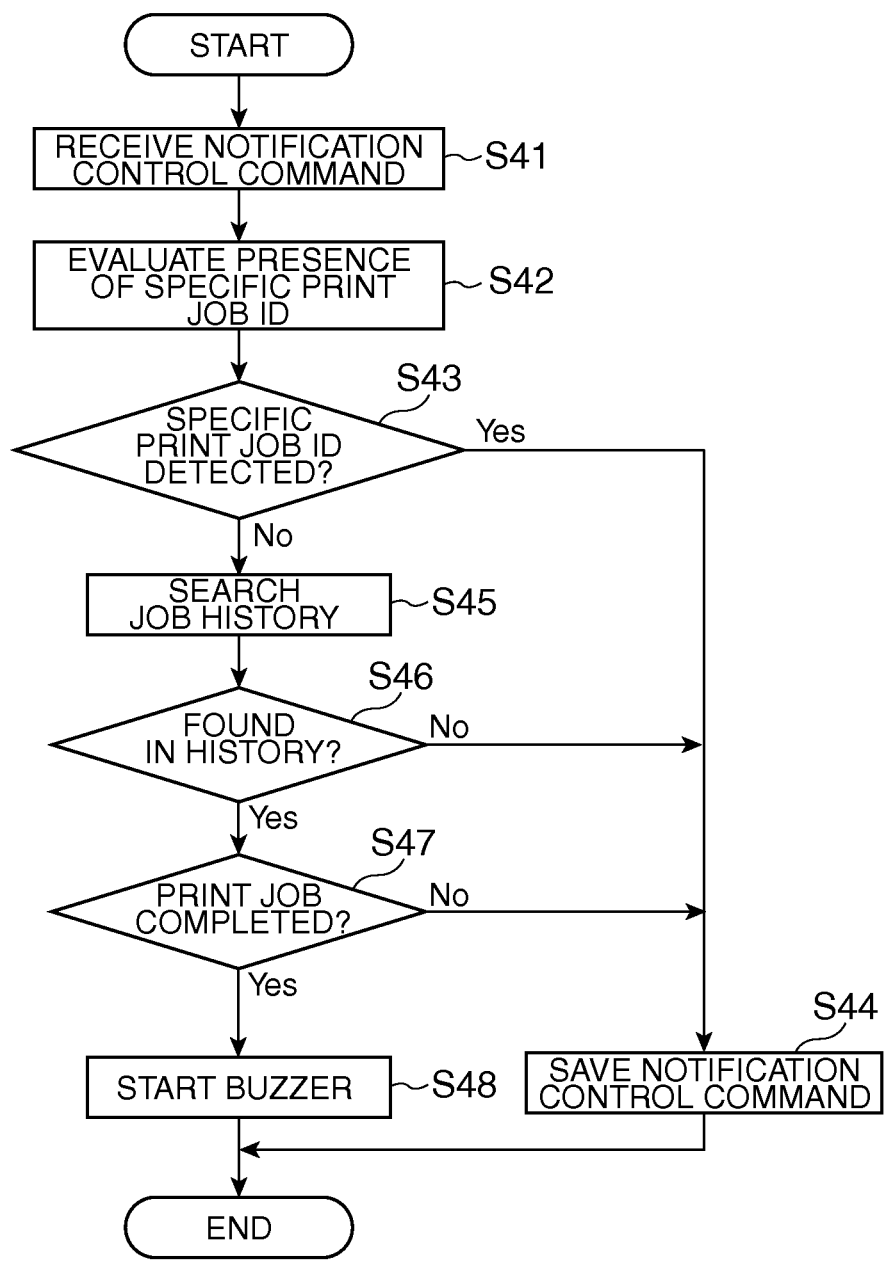
FIG. 7 is a flow chart showing the operation of the printer according to the second embodiment of the invention when an alarm control command is received.

Operation when the printer 3 receives an alarm control command is described next with reference to FIG. 7.

The printer 3 first receives an alarm control command sent from the host computer 2 (S41, alarm control command reception unit). The printer 3 then determines if the same print job ID as the print job ID contained in the received alarm control command is recorded in the print job ID storage area 52 (S42). More specifically, the printer 3 determines if a print job having the print job ID contained in the alarm control command is being printed.

If the corresponding print job ID is in the print job ID storage area 52 (S43 returns Yes), the printer 3 records the alarm control command in the command storage area 53 (S44).

If the corresponding print job ID is not in the print job ID storage area 52 (S43 returns No), the printer 3 searches the job history storage area 51 to determine if the print job ID is recorded in the job history storage area 51 (S45, second notification evaluation unit).

If the corresponding print job ID is not in the job history storage area 51 (S46 returns No), the printer 3 writes the alarm control command in the command storage area 53 (S44).

However, if the print job ID is recorded in the job history storage area 51 (S46 returns Yes), the printer 3 determines if the status of the print job ID recorded in the job history storage area 51 is set to printing-process-completed. If the status of the print job ID is other than printing-process-completed (S47 returns No), the alarm control command is recorded in the command storage area 53 (S44). If the status of the print job ID is printing-process-completed (S47 returns Yes), the printer 3 immediately causes the buzzer 46 to sound based on the alarm pattern of the alarm control command (S48).

This second embodiment of the invention thus sends print jobs and alarm control commands asynchronously from the host computer 2 to the printer 3. After receiving the print job and alarm control command, the printer 3 then executes a printing process based on the print job. Triggered by detecting the end of a print job, the printer 3 causes the buzzer 46 to sound based on the alarm pattern contained in the alarm control command containing the same print job ID as the print job ID of the print job.

This sounding of the buzzer 46 enables the operator to know that the print job ended, and thus can reliably know that issuing the receipt, coupon, or other printout (the print job) has been completed. By teaching the operator to remove the printout after the buzzer 46 sounds, the operator can be prevented from accidentally tearing the printout as a result of trying to remove the printout before the printing process is finished (particularly before the paper has been cut). Paper jams in the printer 3 resulting from tearing the paper can thus be prevented, and the operating rate of the printing services can be improved.

Embodiment 3

A printing system 1 according to a third embodiment of the invention is described next with reference to FIG. 8 to FIG. 13. The printing system 1 according to this third embodiment of the invention enables reporting the start and end of print jobs from a plurality of host computers 2 in addition to identifying the source of the print job (that is, which host computer 2 generated the print job). The control and component configurations of the printer 3 and each of the host computers 2 in the printing system 1 according to this third embodiment are the same as described in the first embodiment (or second embodiment), and the following description focuses on the differences therebetween.

Figure 8:
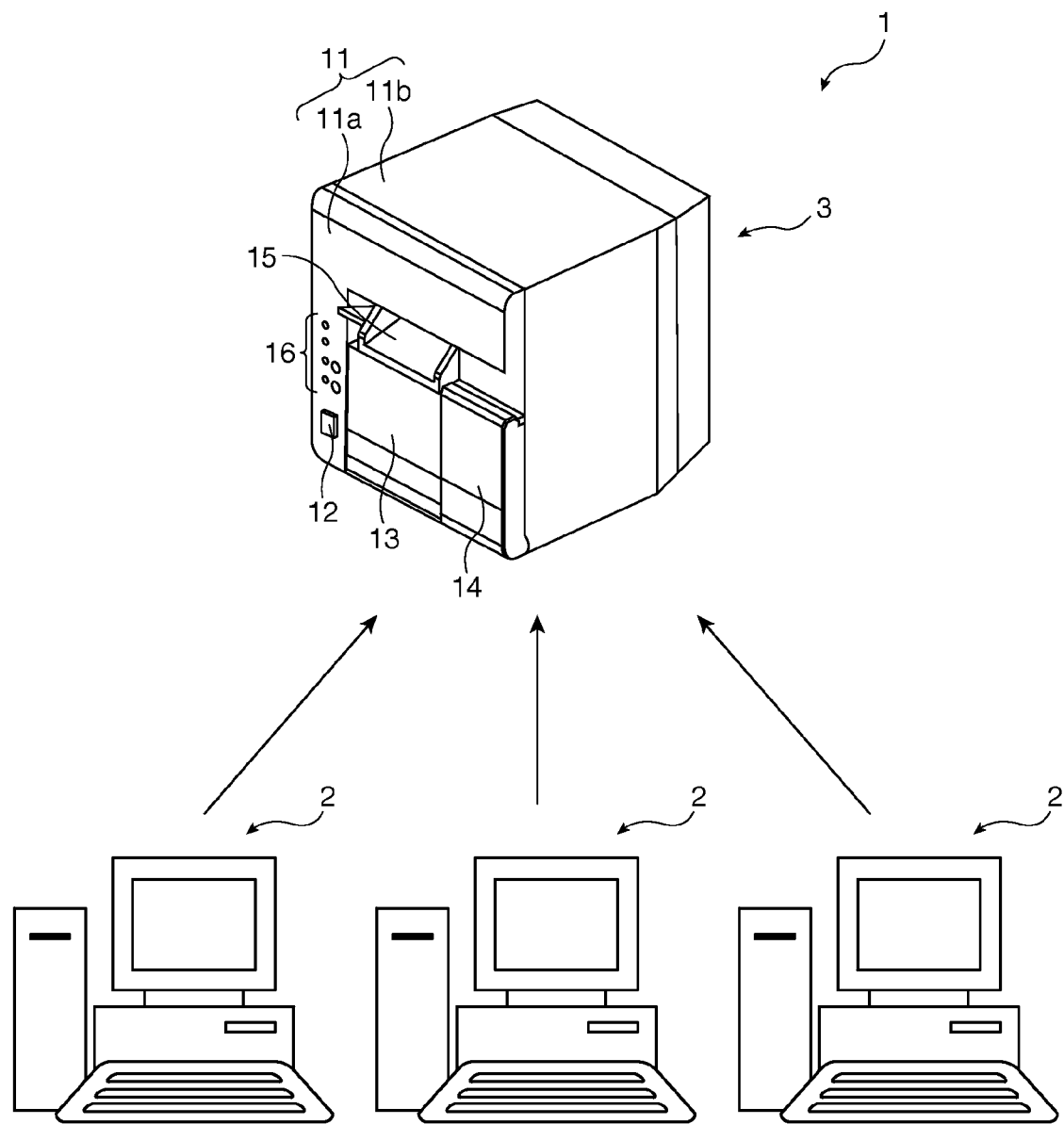
FIG. 8 shows the general configuration of a printing system according to the third embodiment of the invention.

FIG. 8 schematically describes the configuration of the printing system 1 according to this third embodiment of the invention.

As shown in the figure, the printing system 1 according to this third embodiment of the invention has a plurality of host computers 2 (three in this example) and a printer 3. The host computers 2 output the print jobs and alarm control commands (notification control commands) corresponding to particular print jobs. The printer 3 has functions for printing based on the print jobs received from the plural host computers 2, and issuing an alarm based on the corresponding alarm control commands. The plural host computers 2 and the printer 3 can be connected over a network, or the host computers 2 can be individually connected directly to the printer 3.

The host computers 2 are computers that manage the printer 3 and each host computer 2 sends print jobs to the printer 3. When a request to issue a coupon, for example, is received from a POS application not shown, a business application 31 described below is run by the host computer 2 to generate a print job based on the received request, and assign a print job ID and host information identifying the host computer to each print job. The print jobs are managed and sent to the printer 3 based on the print job IDs.

After generating a print job, the host computer 2 generates an alarm control command to sound the buzzer 46 (notification unit, see FIG. 9) of the printer 3 as may be necessary. The alarm control command is defined by the print job ID identifying the print job for which the buzzer 46 of the printer 3 is to be sounded, the timing when the buzzer 46 is to be sounded (the notification timing, such as before printing starts or when printing ends), the sound pattern (notification pattern) issued by the buzzer 46, and the host information identifying the particular host computer 2. By sending this alarm control command to the printer 3, the host computer 2 causes the buzzer 46 to sound at a specific time with a specific pattern.

The host information can be any information uniquely identifying a particular host computer 2, such as the host terminal name or MAC address (Media Access Control address).

When the printer 3 receives a print job from the host computer 2, the printer 3 prints the desired image based on the print job, and then discharges the printed paper (a coupon in this example) from the paper exit 15.

The printer 3 also receives alarm control commands from the host computer 2 and controls sounding the buzzer 46 of the printer based on the alarm control command. The printer 3 drives the buzzer 46 to issue an electronic sound based on the timing (such as before a print job starts or after printing is completed) and the alarm pattern indicated by the alarm control command, which contains the print job ID of the particular print job and the host information, in order to notify the operator that the printing process will start (or the printing process has ended), that is, to notify the operator that a coupon will be discharged (or that a coupon was discharged) from the paper exit 15 using a different sound for each host computer 2.

By issuing a different audible alarm for each host computer, the operator can easily know which host computer 2 sent the print job that is to start (or that has ended), that is, for which customer a coupon will be issued (or was issued), even when the operator is interacting with a customer and is not looking at the printer 3.

The notification or means of reporting the start or end of a print job (the discharge status of coupons from the paper exit 15) can be audible, by driving the buzzer 46 to output an electronic sound using the alarm control command as described above, or visual by using the command to cause an LED 16 shown in FIG. 8 to light steady or blink in a particular pattern.

Figure 9:
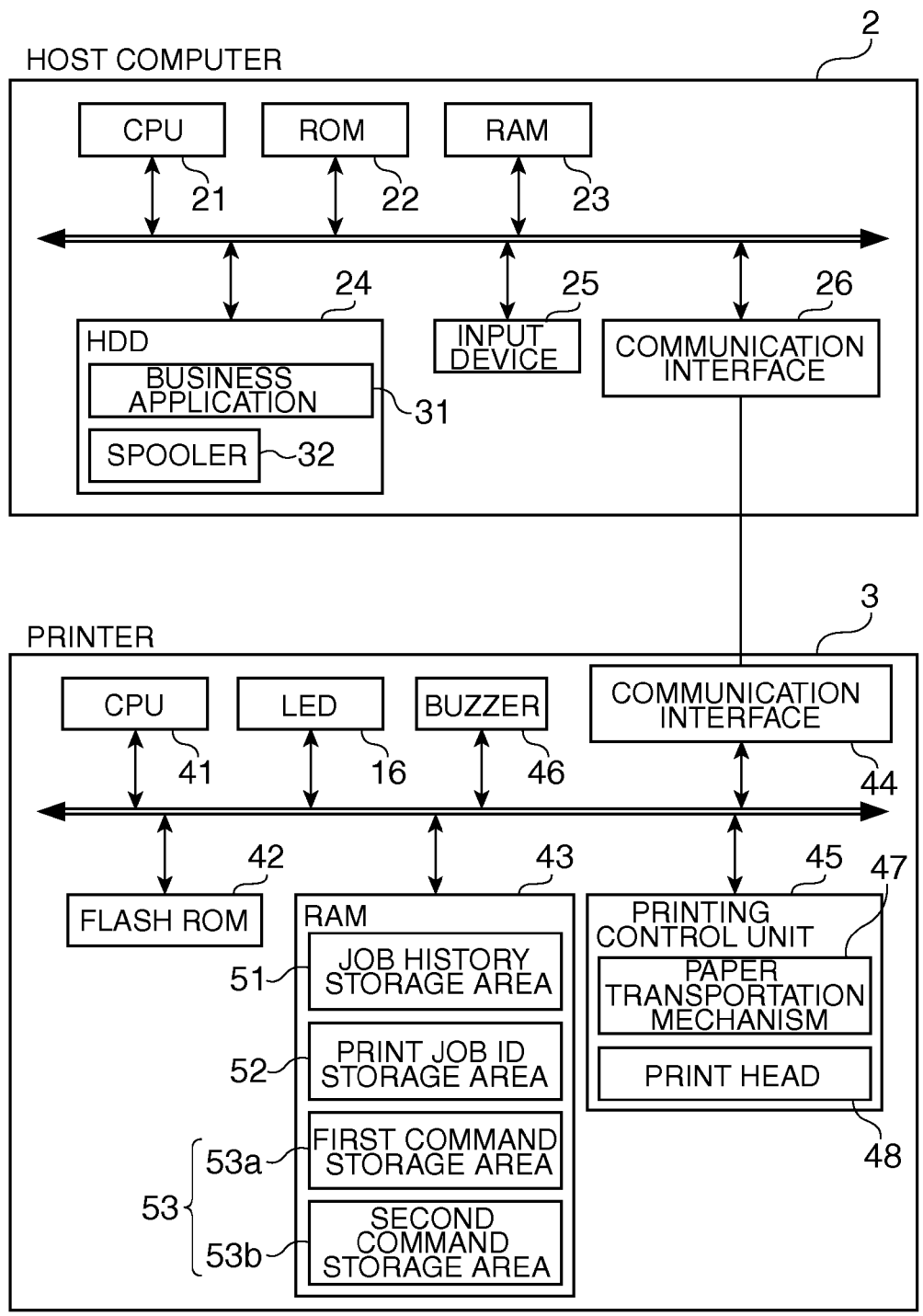
FIG. 9 is a control block diagram of the host computer and printer in the third embodiment of the invention.

The host computer 2 and printer 3 of the printing system 1 according to this third embodiment of the invention are described next with reference to the control block diagram in FIG. 9. The host computers 2 in this third embodiment have the same control configuration as described in the first embodiment.

The CPU 21 executes the business application 31 and generates the desired alarm pattern based on input from the input device 25. The alarm pattern is set differently for each host computer 2 so that a particular host computer 2 can be identified by the difference in the pattern. More particularly, this enables the operator to know which host computer 2 sent a print job that resulted in the printer 3 printing (issuing) the coupon (printout) when multiple host computers 2 share a single printer 3.

When information for issuing a coupon (coupon information) is received from the POS application, for example, the CPU 21 runs the business application 31 and generates print data based on the coupon information. The business application 31 sends a print request with the generated print data to the spooler 32.

The spooler 32 generates a print job based on the print data, and assigns a print job ID and host information to the print job. The spooler 32 then sends the print job ID and host information to the business application 31 as the response to the print request, and the business application 31 thus acquires the print job ID and the host information.

The CPU 21 then sends the print job received from the spooler 32 through the communication interface 26 (print job transmission unit) to the printer 3.

The business application 31 then determines if the print job ID is a particular print job ID (print job evaluation unit). If the print job ID is the particular print job ID, the business application 31 links the alarm timing, the alarm pattern, the print job ID, and the host information to generate the alarm control command. Using the API of the business application 31, the CPU 21 then sends the alarm control command through the communication interface 26 to the printer 3 (alarm control command transmission unit).

By sending an alarm control command for a particular print job, the operator can be informed of the start/end of a particular print job by the printer 3, or more particularly in this example that a particular coupon will be or was issued, and from which host computer 2 the coupon will be or was issued. For example, by signaling the start/end of the print job for only the last coupon when a plurality of coupons are issued for a single customer, the operator can know that the coupon is the last coupon for that customer (printed from the host computer 2 processing information for the particular customer). The operator can therefore reliably know that the last coupon and all of the coupons printed before the notification are for the same customer, and can therefore be prevented from forgetting to give a coupon to the customer.

Sending the print job and sending the alarm control command occur asynchronously, the alarm control command is sent by UDP, and the print job is sent by TCP. This achieves the same effect as the second embodiment described above.

The control configuration of the printer 3 in the third embodiment of the invention is described next. The basic control configuration of the printer 3 in the third embodiment of the invention is the same as that of the printer 3 in the first embodiment, and differs in that the command storage area 53 in RAM 43 includes a first command storage area 53*a* and a second command storage area 53*b* as further described below.

A job history storage area 51 (job history storage unit) for recording the job history of print jobs is reserved in RAM 43, and the print job ID and host information of already completed print jobs and the print job for which printing has started are stored in this job history storage area 51. A print job ID storage area 52 for storing the print job ID and host information of the print job currently being processed, and a command storage area 53 (storage unit) for recording the alarm control command, are also reserved in RAM 43. The command storage area 53 includes a first command storage area 53*a* and a second command storage area 53*b*. The first command storage area 53*a* stores alarm control commands that are configured to output the alarm (notification) before a print job starts, and the second command storage area 53*b* stores alarm control commands that are configured to output the alarm (notification) when a print job ends.

The CPU 41 receives the alarm control command from the host computer 2 through the communication interface 44 (alarm control command reception unit). The CPU 41 then determines if the print job ID and host information contained in the alarm control command matches the print job ID and host information of the print job that is recorded in the print job ID storage area 52 for the currently executing print job (second notification evaluation unit).

If the print job ID and host information match the print job ID of the print job being processed, the CPU 41 controls the buzzer 46 to sound based on the timing and alarm pattern contained in the alarm control command. More specifically, if the timing is set to issue the alarm before the print job starts, the CPU 41 immediately drives the buzzer 46 to sound according to the alarm pattern. If the timing is set to when the print job ends, the CPU 41 writes the alarm control command in the second command storage area 53*b*.

If the print job ID and host information do not match the print job ID and host information of the print job that has started (including when there is no print job started), the CPU 41 determines if the print job ID and host information contained in the alarm control command is recorded in the job history storage area 51 (second notification evaluation unit), and based on the result controls driving the buzzer 46.

More specifically, if the print job ID and host information are not recorded in the job history storage area 51, the CPU 41 stores the alarm control command based on the output timing contained in the alarm control command. If the timing is set to before the print job starts, the alarm control command is recorded in the first command storage area 53a. If the timing is set to when the print job ends, the alarm control command is recorded in the second command storage area 53b.

If the print job ID is recorded in the job history storage area 51 as a completed job, the CPU 41 immediately drives the buzzer 46 to sound based on the alarm pattern contained in the alarm control command. As a result, if the alarm control command is delayed for some reason, the operator can be reliably notified that the print job has started or ended, that is, that a coupon (printout) was issued or is being printed.

The CPU 41 receives print jobs from the host computer 2 through the communication interface 44 (print job reception unit). The CPU 41 processes the received print job based on the printing control command. More specifically, the CPU 41 starts processing the print job when it reads the JobStart command, and then interprets the JobName command. The print job ID and host information are set as parameters in the JobName command, and the CPU 41 thus acquires the print job ID and host information for the print job.

When the CPU 41 reads the JobName command and detects that the print job has started (print job detection unit), it records the print job ID and host information in the print job ID storage area 52 and job history storage area 51 with the printing-started status.

Triggered by this detection, the CPU 41 determines if there is an alarm control command containing the same print job ID and host information as the print job ID and host information of the print job stored in the first command storage area 53a (first notification evaluation unit).

If the corresponding alarm control command is found, the CPU 41 controls the buzzer 46 to sound based on the alarm pattern in the alarm control command. After the buzzer 46 stops, the CPU 41 clears the alarm control command stored in the first command storage area 53a.

If the alarm control command is not found, the CPU 41 starts the printing process described below without causing the buzzer 46 to sound.

The CPU 41 then interprets the JobPrint command and starts printing the print data. In this case the CPU 41 outputs a print command based on the print data to the printing control unit 45. After receiving the print command, the printing control unit 45 prints based on the print data and discharges a coupon from the paper exit 15. When the CPU 41 then reads (processes) the JobEnd command contained in the print job (print control command) and finishes processing the command, it detects that all processing for the print job is completed (print job detection unit).

Triggered by this detection, the CPU 41 determines if there is an alarm control command containing the same print job ID and host information as the print job ID and host information of the print job stored in the second command storage area 53b (second notification evaluation unit).

If the corresponding alarm control command is found, the CPU 41 controls the buzzer 46 to sound based on the alarm pattern in the alarm control command, updates the job history storage area 51 and sets the status of the print job in to printing-completed. After the buzzer 46 stops, the CPU 41 clears the alarm control command stored in the command storage area 53.

If the alarm control command is not found, the CPU 41 updates the job history storage area 51 and sets the status of the print job to printing-completed.

Figure 10:
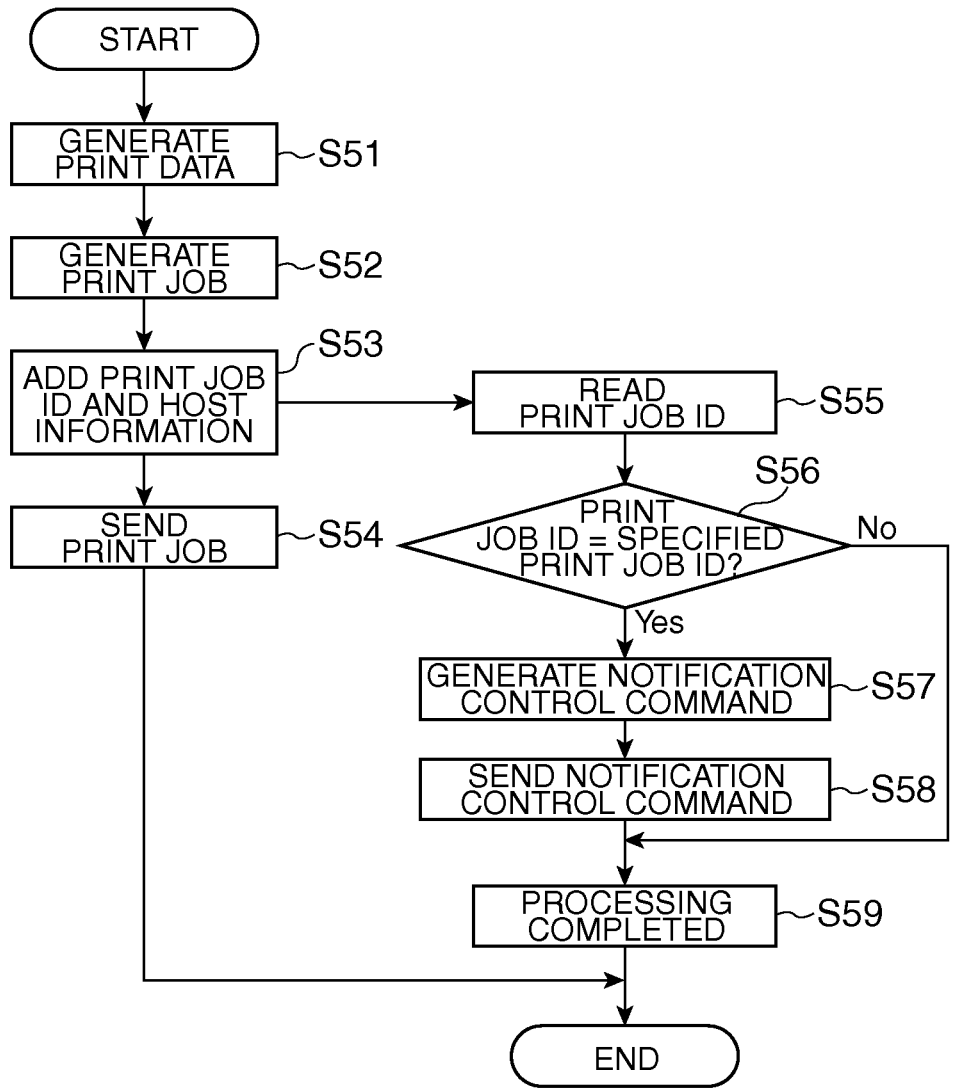
FIG. 10 is a flow chart showing a procedure for generating print jobs and alarm control commands in the third embodiment of the invention.

The process of generating a print job and the alarm control command is described next with reference to FIG. 10.

When the host computer 2 receives the coupon information, it generates print data based on the coupon information (S51). The host computer 2 then generates a print job based on the generated print data (S52) and assigns a print job ID and host information to the print job (S53). The host computer 2 then sends the print job to the printer 3 (S54, print job transmission unit).

The host computer 2 also determines if the print job ID is a specific print job ID (S55, print job evaluation unit). If the print job ID is the specific predetermined print job ID (S56 returns Yes), the host computer 2 generates an alarm control command containing the print job ID, the host information, and the output timing and the alarm pattern of the buzzer 46 (S57). The output timing is set to either sound the buzzer 46 before printing the corresponding print job starts, or to sound the buzzer 46 after printing starts. The host computer 2 then sends this alarm control command to the printer 3 asynchronously to transmission of the print job (S58, notification control command transmission unit), and completes the process (S59). However, if the print job ID is not the predetermined print job ID (S56 returns No), the host computer 2 aborts processing without generating the alarm control command (S59).

Figure 11:
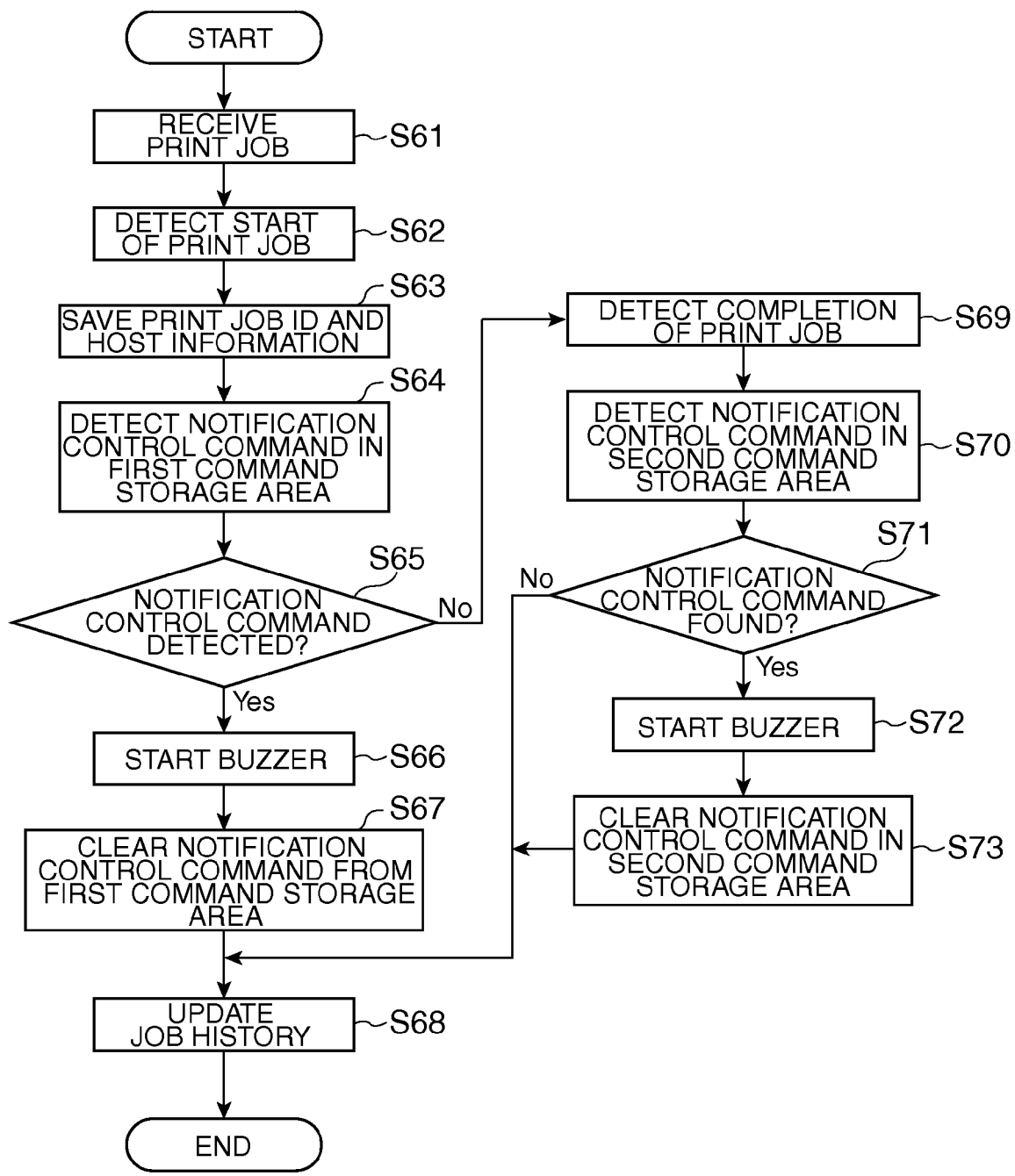
FIG. 11 is a flow chart showing the operation of the printer according to the third embodiment of the invention when a print job is received.

Operation of the printer 3 when the printer 3 receives a print job is described next with reference to FIG. 11.

The printer 3 first receives a print job sent from the host computer 2 (S61, print job reception unit). The printer 3 then starts a printing process based on the print job. More specifically, the printer 3 detects the start of a print job by receiving (interpreting) the JobName command (or JobStart command) contained in the print job (S62, print job detection unit). The printer 3 thus acquires the print job ID and host information contained in the print job, and records the print job ID and host information in the job history storage area 51 and print job ID storage area 52 with the printing-process-started status (S63). Whether an alarm control command containing the same print job ID and host information as the print job ID and host information of the print job is stored in the first command storage area 53a is also determined (S64, first notification evaluation unit).

If the alarm control command is in the first command storage area 53a (S65 returns Yes), the printer 3 causes the buzzer 46 to sound based on the alarm pattern in the alarm control command (S66). After the buzzer 46 stops, the printer 3 clears the alarm control command stored in the first command storage area 53a (S67). The printer 3 then continues the printing process, and after the entire printing process for the print job is completed, updates the status of the print job ID in the job history storage area 51 to printing-process-completed (S68).

If the alarm control command is not in the first command storage area 53a (S65 returns No), the printer 3 continues the printing process and detects when the printing process for the print job has ended (S69, print job detection unit). Triggered by detecting the end of the print job, whether an alarm control command containing the same print job ID and host information as the print job ID and host information of the completed print job is in the second command storage area 53b is determined (S70, first notification evaluation unit). If the alarm control command is found in the second command storage area 53b (S71 returns Yes), the printer 3 causes the buzzer 46 to sound based on the alarm pattern of the alarm control command (S72). After the buzzer 46 stops, the printer 3 clears the alarm control command recorded in the second command storage area 53b (S73). The printer 3 then updates the status of the print job ID in the job history storage area 51 to printing-process-completed (S68).

If the alarm control command is not found in the second command storage area 53b (S71 returns No), the printer 3 updates the status of the print job ID in the job history storage area 51 to printing-process-completed (S68).

Figure 12:
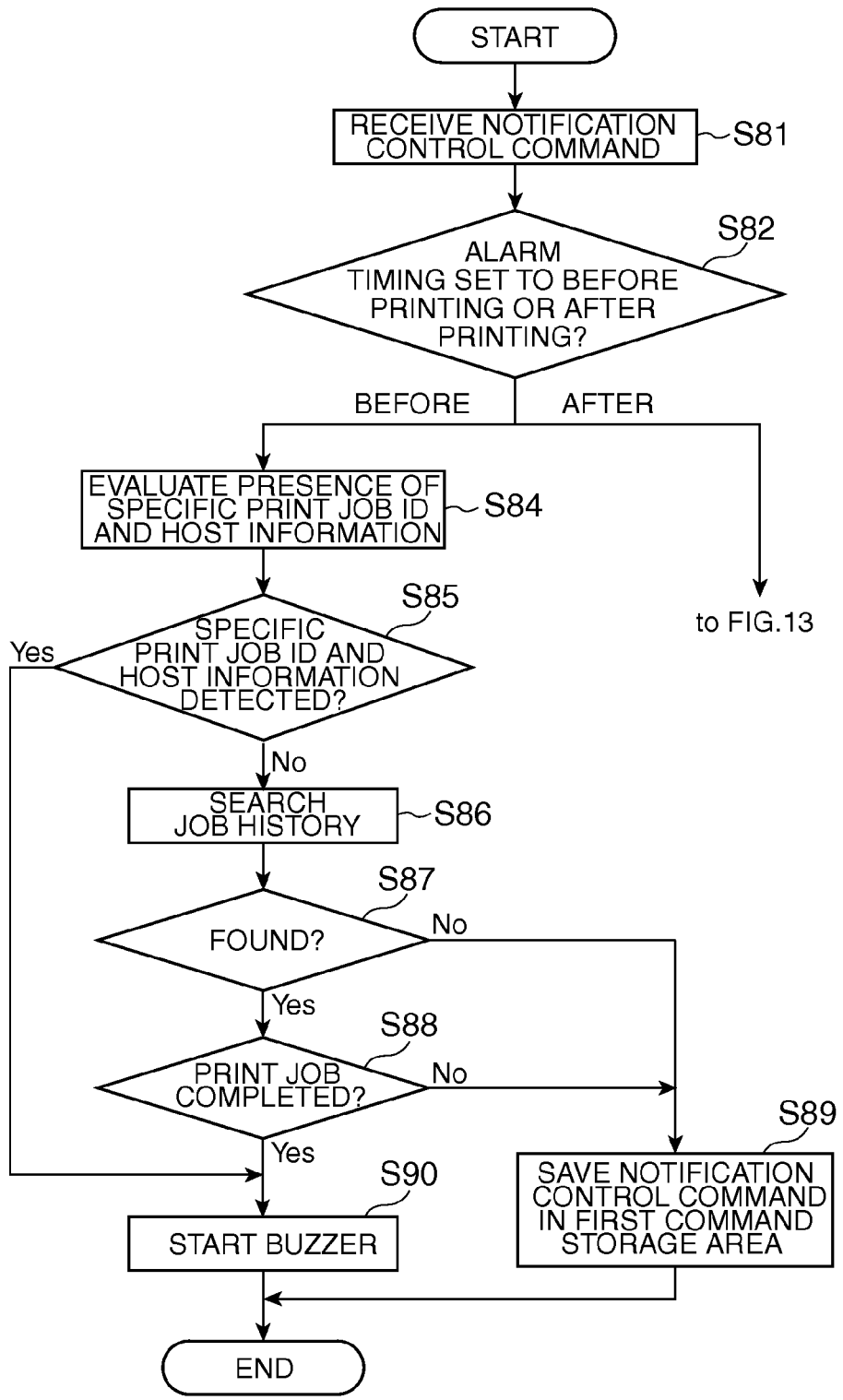
FIG. 12 is a flow chart showing the operation of the printer according to the third embodiment of the invention when an alarm control command is received.
Figure 13:
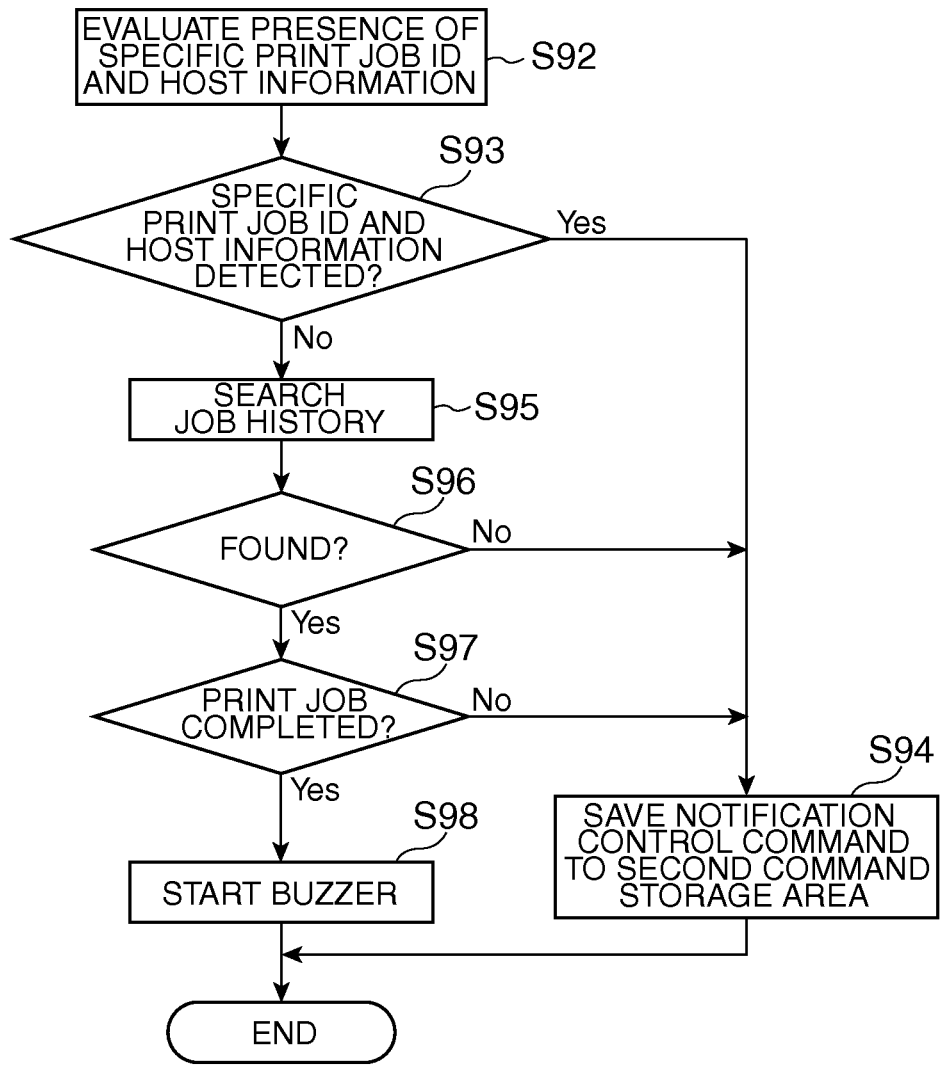
FIG. 13 is a flow chart showing the operation of the printer according to the third embodiment of the invention when an alarm control command is received.

Operation when the printer 3 receives an alarm control command is described next with reference to FIG. 12 and FIG. 13.

The printer 3 first receives an alarm control command sent from the host computer 2 (S81, alarm control command reception unit). The printer 3 then determines if the output timing of the alarm control command is set to before the print job starts or after the print job ends, and proceeds according to the result of this decision (S82).

If the timing is set to before the print job starts (S82; before the print job starts), the printer 3 determines if a print job ID and host information matching the print job ID and host information contained in the received alarm control command are recorded in the print job ID storage area 52 (S84, second notification evaluation unit). More specifically, the printer 3 determines if the print job identified by the print job ID and host information contained in the alarm control command is being executed.

If the corresponding print job ID and host information are found in the print job ID storage area 52 (S85 returns Yes), the printer 3 immediately causes the buzzer 46 to sound based on the alarm pattern of the alarm control command (S90).

If the corresponding print job ID and host information are not in the print job ID storage area 52 (S85 returns No), the printer 3 searches the job history storage area 51 to determine if the print job ID and host information are recorded in the job history storage area 51 (S86, second notification evaluation unit).

If the corresponding print job ID and host information are not in the job history storage area 51 (S87 returns No), the printer 3 writes the alarm control command in the first command storage area 53a (S89).

However, if the print job ID and host information are recorded in the job history storage area 51 (S87 returns Yes), the printer 3 determines if the status of the print job ID and host information recorded in the job history storage area 51 is set to printing-process-completed. If the status of the print job ID and host information is other than printing-process-completed (S88 returns No), the alarm control command is recorded in the first command storage area 53a (S89). If the status of the print job ID is printing-process-completed (S88 returns Yes), the printer 3 immediately causes the buzzer 46 to sound based on the alarm pattern of the alarm control command (S90).

If the output timing of the alarm is set to after the print job is completed (s82; after the print job is completed), the printer 3 determines if a print job ID and host information matching the print job ID and host information contained in the received alarm control command are recorded in the print job ID storage area 52 (S92). More specifically, the printer 3 determines if the print job identified by the print job ID and host information contained in the alarm control command is being executed.

If the corresponding print job ID and host information are found in the print job ID storage area 52 (S93 returns Yes), the printer 3 writes the alarm control command to the second command storage area 53b (S94).

If the corresponding print job ID and host information are not found in the print job ID storage area 52 (S93 returns No), the printer 3 searches the job history storage area 51 to see if the print job ID and host information are in the job history storage area 51 (S95, second notification evaluation unit).

If the corresponding print job ID and host information are not in the job history storage area 51 (S96 returns No), the printer 3 writes the alarm control command in the second command storage area 53b (S94).

If the corresponding print job ID and host information are in the job history storage area 51 (S96 returns Yes), the printer 3 determines if the status of the print job ID and host information in the job history storage area 51 is set to printing-process-completed.

If the status of the print job ID and host information in the job history storage area 51 is set to other than printing-process-completed (S97 returns No), the alarm control command is written to the second command storage area 53b (S94).

If the status of the print job ID and host information in the job history storage area 51 is set to printing-process-completed (S97 returns Yes), the printer 3 immediately causes the buzzer 46 to sound based on the alarm pattern of the alarm control command (S98).

In this third embodiment of the invention, the host computer 2 sends an alarm control command containing the print job ID, host information identifying the host computer 2, and alarm pattern information to the printer 3 together with the print job. The printer 3 stores the alarm control command in a local storage unit (command storage area 53) and executes the print job. When the printer 3 detects the start or end of the print job, detection of the start or end triggers determining if an alarm control command containing the same print job ID and host information as the print job ID and host information of the print job is stored in memory. If the alarm control command is stored in memory, a buzzer 46 is driven to notify the operator. The operator thus knows that the print job has started or ended, and thus knows that the process of issuing (printing) a receipt or coupon, for example, has started or ended.

Furthermore, by setting a different alarm pattern for each host computer 2, the operator can know which host computer 2 printed the output from the printer 3 when a plurality of host computers 2 share a single printer 3. The operator thus knows to which customer the printout is to be given, and problems such as forgetting to deliver the printout correctly can be prevented.

In the first, second, and third embodiments of the invention described above the host computer 2 generates the alarm pattern and sends the alarm pattern to the printer 3 to control the buzzer 46. The invention is not so limited, however, and a plurality of alarm patterns can be preinstalled to the printer 3. The host computer 2 can then simply send information identifying which alarm pattern to use to the printer 3 in order to control the buzzer 46. This eliminates the need to send the actual alarm pattern, and thus reduces the traffic associated with sending the alarm pattern. The storage unit (alarm pattern storage unit) that records the alarm pattern in this case is the flash ROM 42 shown in FIG. 2 and FIG. 9.

In the first to third embodiments of the invention described above the start or end of a particular print job is signaled by sounding a buzzer 46, but the invention is not so limited and the start or end of each print job could be signaled for all print jobs.

Further alternatively, the printer 3 could start driving the buzzer 46 when triggered by detecting the start of a print job, and stop driving the buzzer 46 when triggered by detecting the end of the print job. By thus sustaining the notification while the print job is printing, the operator knows that the receipt, coupon, or other content is being printed. More specifically, the operator knows that printing the job has ended (the print job has ended) when the notification ends (when the alarm stops sounding). This prevents the operator from accidentally tearing the printout as a result of trying to remove the printout before the printing process is completed (particularly before the paper is cut). Paper jams in the printer 3 resulting from tearing the paper can thus be prevented, and the operating rate of the printing services can be improved.

Coupons are used by way of example as the printout generated in the foregoing embodiments of the invention, but the invention is not so limited.

The control method of the printing system 1, and the functions of the host computer 2 and printer 3 described above can be embodied as a computer-executable program.

This program can be recorded on a computer-readable storage medium (not shown in the figure). Examples of such recording media include CD-ROM, flash ROM, memory cards (including CompactFlash (R), smart media, and memory sticks), Compact Disc media, magneto-optical media, DVD media, and floppy disks.

The configuration and operation of the printing system 1, the host computer 2, and the printer 3 according to the present invention are also not limited to the foregoing embodiments and can be varied in many ways without departing from the scope of the accompanying claims.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A control method for printing a coupon, comprising:
generating print data based on coupon information when a host computer receives the coupon information;
generating a print job based on the print data;
assigning a print job ID to the print job;
sending the print job from the host computer to a printer;
determining when the print job ID is a predetermined print job ID;
generating an alarm control command containing the print job ID, when the print job ID is determined to be the predetermined print job ID;
sending the alarm control command from the host computer to the printer, the sending of the alarm control command being performed asynchronously with respect to the sending of the print job;
starting a printing process based on the print job received by the printer;
acquiring the print job ID of the print job, and recording the print job ID in a print job ID storage area when the printing process based on the print job is started;
causing an alarm based on the alarm control command when it is received in the printer when (i) the print job ID of the print job that started the printing process is the same as the print job ID contained in the alarm control command, or (ii) the print job ID contained in the alarm control command is the same as the print job ID recorded in the print job ID storage area;
recording a job history of the print job being processed in a job history storage area while the print job is sent from the host computer to the printer;
causing an alarm based on the alarm control command when it is received in the printer when the print job ID contained in the alarm control command is recorded in the job history storage area; and
determining when the print job ID contained in the alarm control command is recorded in the job history storage area, when it is determined that the corresponding print job ID is not in the print job ID storage area.

2. The control method described in claim 1, wherein:
the predetermined print job ID is for issuing a last coupon to a particular customer.

3. The control method described in claim 1, further comprising:
recording the alarm control command in a command storage area, when the corresponding print job ID is not in the job history storage area.

4. The control method described in claim 1, wherein:
the host computer aborts processing without generating the alarm control command, when it is determined that the print job ID contained therein is not the predetermined print job ID.

5. A printing system for printing a coupon, comprising:
a host computer that comprises:
a print job generating unit that generates a print job containing print data and a print job ID when information for issuing the coupon is received from an application,
a print job transmission unit that send the print job, a print job evaluation unit that determines if when the print job ID is a predetermined print job ID,
an alarm control command generating unit that generates an alarm control command containing the print job ID, when the print job ID is determined to be the predetermined print job ID, and
an alarm control command transmission unit that operates asynchronously to the print job transmission unit and sends the alarm control command; and
a printer that comprises:
a print job reception unit that receives the print job,
a storage unit including a print job storage area that stores the print job ID contained in the print job sent from the host computer and being processed, a command storage area that stores the alarm control command, and a job history storage area that stores the print job for which printing has started,
a print unit that prints the coupon based on the print data contained in the print job sent from the host computer,
a print job detection unit that detects that the print job has started,
an alarm control command reception unit that receives the alarm control command from the host computer,
a first alarm evaluation unit that determines when the print job ID contained in the print job being processed is the same as the print job ID stored in the command storage area, the determination by the first alarm evaluation unit being triggered by detection that the print job has started,
a second alarm evaluation unit that determines when the print job ID contained in the alarm control command is the same as the print job ID stored in the print job storage area or the job history storage area, and
an alarm that outputs a user notification based on the alarm control command, wherein the alarm outputs when (i) the print job ID contained in the print job being processed and the print job ID contained in the alarm control command are determined to be the same, or (ii) the print job ID contained in the alarm control command and the print job ID stored in the print job storage area or the job history storage area are determined to be the same; wherein a job history of the print job being processed is recorded in the job history storage area while the print job is sent from the host computer to the printer;

an alarm based on the alarm control command is caused when the alarm control command is received in the printer when the print job ID contained in the alarm control command is recorded in the job history storage area; and when the print job ID contained in the alarm control command is recorded in the job history storage area is determined, when it is determined that the corresponding print job ID is not in the print job ID storage area.

6. The printing system described in claim 5, wherein:

the predetermined print job ID is for issuing a last coupon to a particular customer.

7. The printing system described in claim 5, wherein:

the storage unit records a job history of the print job being processed.

* * * * *